US012533587B2

United States Patent

(12) United States Patent
Fukada et al.

(10) Patent No.: US 12,533,587 B2
(45) Date of Patent: Jan. 27, 2026

(54) INFORMATION PROCESSING SYSTEM, NON-TRANSITORY COMPUTER-READABLE STORAGE MEDIUM HAVING STORED THEREIN INFORMATION PROCESSING PROGRAM, INFORMATION PROCESSING METHOD, AND INFORMATION PROCESSING APPARATUS

(71) Applicant: NINTENDO CO., LTD., Kyoto (JP)

(72) Inventors: Naoki Fukada, Kyoto (JP); Akira Furukawa, Kyoto (JP); Takahiro Takayama, Kyoto (JP); Yuya Sato, Kyoto (JP); Ryuju Maeno, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 344 days.

(21) Appl. No.: 18/303,695

(22) Filed: Apr. 20, 2023

(65) Prior Publication Data

US 2023/0277936 A1 Sep. 7, 2023

Related U.S. Application Data

(63) Continuation of application No. PCT/JP2022/009228, filed on Mar. 3, 2022.

(51) Int. Cl.
*A63F 13/56* (2014.01)

(52) U.S. Cl.
CPC .................................... *A63F 13/56* (2014.09)

(58) Field of Classification Search
CPC .......... A63F 13/56; A63F 13/57; A63F 13/63; A63F 13/803; A63F 13/822; A63F 13/69
(Continued)

(56) References Cited

U.S. PATENT DOCUMENTS 7,243,053 B1 * 7/2007 Small ..................... A63H 30/00 446/454
10,583,354 B2 * 3/2020 Muthyala ............. A63H 33/042
(Continued)

FOREIGN PATENT DOCUMENTS

DE 102020111859 A1 * 11/2021
JP 2005-000338 1/2005
(Continued)

OTHER PUBLICATIONS

Lego, “Digital Building Instructions—Lego Technic”, https://www.youtube.com/watch?v=DeogMkQKDAA, Jan. 17, 2014 (Year: 2014).*
(Continued)

*Primary Examiner* — Michael A Cuff
(74) *Attorney, Agent, or Firm* — Nixon & Vanderhye PC

(57) ABSTRACT

An exemplary information processing system generates an assembled object by assembling a plurality of virtual objects based on an input by a user. The plurality of virtual objects include virtual power objects each configured to provide power to the assembled object and a virtual controller object. While the virtual power object and the virtual controller object are included in the assembled object, the information processing system causes the one or more virtual power objects to operate to move the assembled object in a predetermined traveling direction, and causes a moving direction of the movable object to change based on an input by the user.

20 Claims, 22 Drawing Sheets

(58) Field of Classification Search
USPC .............................................................. 463/31
See application file for complete search history.

(56) References Cited

U.S. PATENT DOCUMENTS

| | | | | |
|---|---|---|---|---|
| 2005/0024360 | A1 | 2/2005 | Abe et al. | |
| 2007/0063997 | A1 | 3/2007 | Scherer et al. | |
| 2010/0285880 | A1* | 11/2010 | Crocker | A63F 13/63 463/36 |
| 2014/0066195 | A1* | 3/2014 | Matsui | A63F 13/533 463/30 |
| 2015/0094153 | A1* | 4/2015 | Silverglate | A63H 17/38 463/43 |
| 2018/0078868 | A1* | 3/2018 | Mueller | A63H 30/04 |
| 2019/0297480 | A1* | 9/2019 | Cody | A63H 17/26 |
| 2020/0061481 | A1* | 2/2020 | Payne | A63H 18/026 |
| 2020/0330886 | A1* | 10/2020 | Kelliher | A63H 18/02 |

FOREIGN PATENT DOCUMENTS

| | | |
|---|---|---|
| JP | 2005-038303 | 2/2005 |
| JP | 2007-500906 | 1/2007 |
| JP | 2007-021248 | 2/2007 |
| JP | 2016-010452 | 1/2016 |

OTHER PUBLICATIONS

Jan. 22, 2024 Office Action issued in Japanese Patent Application No. 2023-523125, pp. 1-3 [machine translation included].

"M.A.V., Modular Assault Vehicle, a robot game in which you assemble parts and fight", [online], Feb. 6, 2014, Kickstarter, Kickstarter fan!, [Searched on Jan. 18, 2024], Internet <URL: https://www.kickstarterfan.com/archives/108> pp. 1-3.

"M.A.V.—Modular Assault Vehicle", YouTube [online] [video] , Pledged Allegiance, Feb. 7, 2014, [Searched on Jan. 18, 2024], https://www.youtube.com/watch?v=vk5fUjeDjKI , 0:27-0:35, pp. 1-5.

May 17, 2022 Written Opinion issued in International Application No. PCT/JP2022/009228, with partial English translation.

Game Master Corporation, "Ryu-ga-Gotoku 0 Chikai no Basho Kanzen Koryaku Kiwame no Sho", first edition, Kadokawa Dwango Corporation, Hirokazu Hamamura, Apr. 27, 2015, pp. 373-381, ISBN:978-4-404-733001-6.

"Shissou, Yankeedamashii.", "Futabasha Super Mook Online Game Sugoi Koryaku Yattemasu. vol. 22", May 10, 2008, vol. 22, pp. 154-157.

"Wacky☆Pilots", "Apuri Fan vol. 6 Hanryusenpu January issue extra edition", Jan. 1, 2013, vol. 6, p. 159.

* cited by examiner

BEFORE CORRECTION IN ROLL DIRECTION

AFTER CORRECTION IN ROLL DIRECTION

INFORMATION PROCESSING SYSTEM, NON-TRANSITORY COMPUTER-READABLE STORAGE MEDIUM HAVING STORED THEREIN INFORMATION PROCESSING PROGRAM, INFORMATION PROCESSING METHOD, AND INFORMATION PROCESSING APPARATUS

CROSS REFERENCE TO RELATED APPLICATION

This application is a continuation of International Patent Application No. PCT/JP2022/009228 filed Mar. 3, 2022, the entire contents of which is incorporated herein by reference.

FIELD

An exemplary embodiment relates to an information processing system, a non-transitory computer-readable storage medium having stored therein an information processing program, an information processing method, and an information processing apparatus that are capable of assembling a plurality of virtual objects by an operation of a user.

BACKGROUND AND SUMMARY

As a related art, there is a game system for moving an operation target object and bringing the operation target object into contact with an object present in a virtual space, thereby forming a plurality of objects in a unified manner.

However, there is room for improvement in terms of improving usability, in cases of assembling a plurality of virtual objects to generate an object composed of a plurality of virtual objects through an operation performed by a user.

Therefore, an object of this exemplary embodiment is to provide an information processing system, an information processing program, an information processing method, and an information processing apparatus each of which is capable of improving the usability in cases of generating an object including a plurality of virtual objects by assembling a plurality of virtual objects.

To achieve the above-described object, this exemplary embodiment adopts a configuration as described below.

An information processing system of this exemplary embodiment is an information processing system including at least one processor and at least one a memory coupled thereto, for performing game processing based on an input by a user, the at least one processor being configured to at least: generate an assembled object by assembling a plurality of virtual objects, based on an input by the user, the plurality of virtual objects including one or more virtual power objects configured to provide power to the assembled object when the virtual power object is assembled as a part of the assembled object and a virtual controller object capable of being assembled as a part of the assembled object; control the assembled object arranged in the virtual space; and while the one or more virtual power objects and the virtual controller object are included in the assembled object, causing the one or more virtual power objects to operate to move the assembled object in a predetermined traveling direction, and causes a moving direction of the assembled object to change based on an input by the user.

According to the above, the user can generate an assembled object including the virtual controller object by assembling a plurality of virtual objects and control the movement of the assembled object.

Further, an operation state of each of the one or more virtual power objects may include an ON state that provides the power and an OFF state that does not provide the power. Further, the at least one processor may set the operation state of one of the virtual power objects to the ON state or the OFF state based on an input by the user. The at least one processor may generate the assembled object including the virtual controller object and a plurality of the virtual power objects. The at least one processor may simultaneously set all the virtual power objects in the assembled object to the ON state or the OFF state.

According to the above, a plurality of virtual power objects are simultaneously set to the ON state or OFF state. This improves the convenience of the user as compared with a case of individually setting the plurality of virtual power objects to the ON state or OFF state.

Further, the at least one processor may arrange the virtual controller object at a position in the assembled object designated by the user.

According to the above, the user can arrange the virtual controller object in a desirable position in the assembled object, and this improves the degree of freedom in generating of the assembled object.

Further, the virtual objects constituting the assembled object may be each provided with a preferential part which is given priority over other parts. The at least one processor may preferentially arrange the virtual controller object in the preferential part of a virtual object constituting the assembled object.

According to the above, the user can arrange the virtual controller object in a desirable position, and the virtual controller object can be preferentially arranged in the preferential part, and the convenience of arranging the virtual controller object in the assembled object is improved.

Further, the at least one processor may: move a user character in the virtual space; move the user character to a position corresponding to the virtual controller object based on an input by the user; and when the user character is at the position corresponding to the virtual controller object, control the assembled object in response to an input by the user.

According to the above, the assembled object is controllable while the user character is at the position corresponding to the virtual controller object.

Further, the at least one processor may cause the user character to operate the virtual controller object, thereby changing a direction of at least a part of the virtual controller object and changing a moving direction of the assembled object.

According to the above, the direction of at least a part of the virtual controller object is changed to change the moving direction of the assembled object, by having the user character operate the virtual controller object based on an input by the user. As a result, a scene in which the user character operates the virtual controller object is displayed, which causes the user to feel as if it is the user him/herself who is operating the virtual controller object to control the moving direction of the assembled object.

Further, the at least one processor may change the moving direction of the assembled object according to an input direction by the user, irrespective of the position of the virtual controller object in the assembled object.

According to the above, no matter where the virtual controller object is arranged, the user can change the moving direction of the assembled object through the same operation, which improves the convenience.

Further, the at least one processor may arrange the virtual controller object in the assembled object so as to be oriented as designated by the user.

According to the above, it is possible to arrange the virtual controller object in a desirable direction, and improve the degree of freedom in generating the assembled object.

Further, the at least one processor may change the moving direction of the assembled object according to an input direction by the user, irrespective of the orientation of the virtual controller object in the assembled object.

According to the above, no matter in which direction the virtual controller object is oriented, the user can change the moving direction of the assembled object through the same operation.

Further, the at least one processor may change the moving direction of the assembled object by giving the assembled object a rotating speed about a position of a center of gravity of the assembled object.

According to the above, the moving direction of the assembled object can be changed even if the user uses various virtual objects to generate the assembled object.

Further, the at least one processor may change the moving direction of the assembled object by giving each of the virtual objects constituting the assembled object the rotating speed about the position of the center of gravity of the assembled object.

According to the above, the assembled object can be rotated by giving a rotating speed to each of the virtual objects and the moving direction of the assembled object can be changed even if the user uses various virtual objects to generate the assembled object.

Further, the assembled object may be an object that moves in the virtual space while contacting the ground. When the moving direction of the assembled object is changed, the at least one processor may be configured to reduce friction between the assembled object and the ground as compared to friction while the assembled object moves in the traveling direction.

This makes it easier to turn the assembled object in contact with the ground.

Further, the processor may be further configured to correct the posture of the assembled object in a roll direction or a pitch direction so as to bring the posture, in the virtual space, of the virtual controller object in the assembled object to a predetermined posture.

According to the above, the virtual controller object can be maintained at a predetermined posture, even if the posture of the assembled object changes.

Further, the at least one processor may be capable of generating a first assembled object including a plurality of the virtual objects and a second assembled object including a plurality of the virtual objects. The virtual controller object may be capable of being assembled to either the first assembled object or to the second assembled object.

According to the above, a common virtual controller object can be assembled whether the first assembled object or the second assembled object is generated by the user.

Further, another exemplary embodiment may be an information processing apparatus including the at least one processor, or an information processing program that causes a computer of an information processing apparatus to execute the above processing. Further, another exemplary embodiment may be an information processing method executable in the information processing system.

According to this exemplary embodiment, an assembled object including a virtual controller object can be generated by assembling a plurality of virtual objects and the movement of the assembled object can be controlled.

These and other objects, features, aspects and advantages will become more apparent from the following detailed description when taken in conjunction with the accompanying drawings.

DETAILED DESCRIPTION OF NON-LIMITING EXAMPLE EMBODIMENTS

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2.

Figure 1:
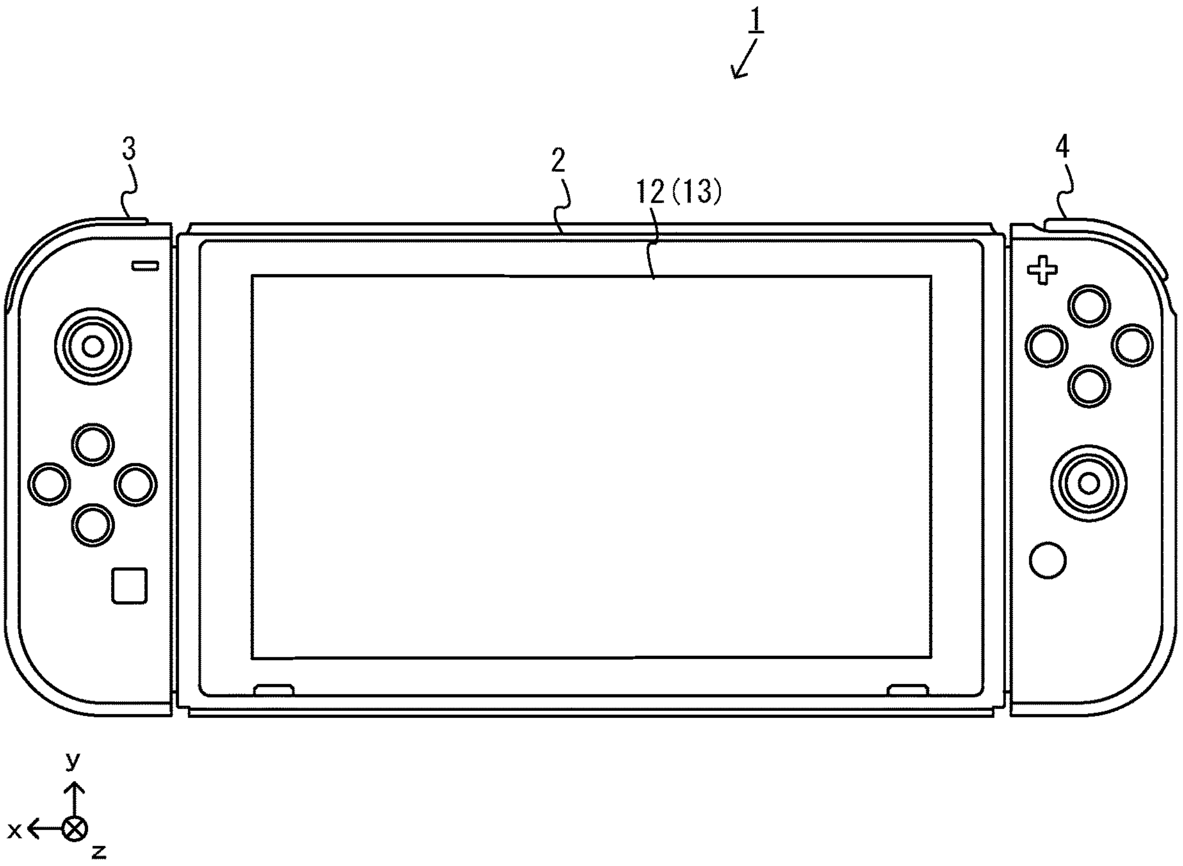
FIG. 1 is an example non-limiting diagram showing an exemplary state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
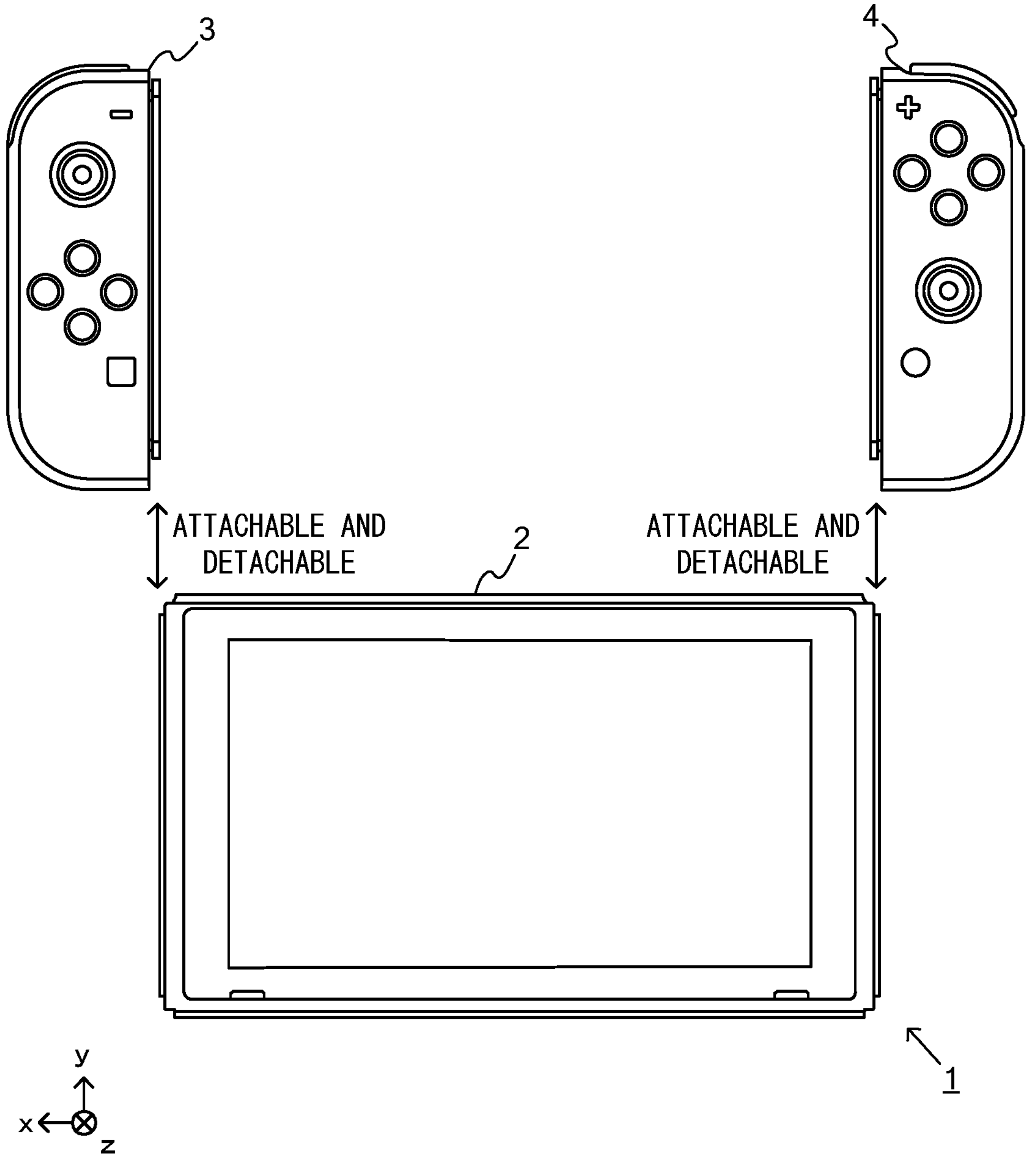
FIG. 2 is an example non-limiting diagram showing an exemplary state where a left controller 3 and a right controller 4 are detached from a main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
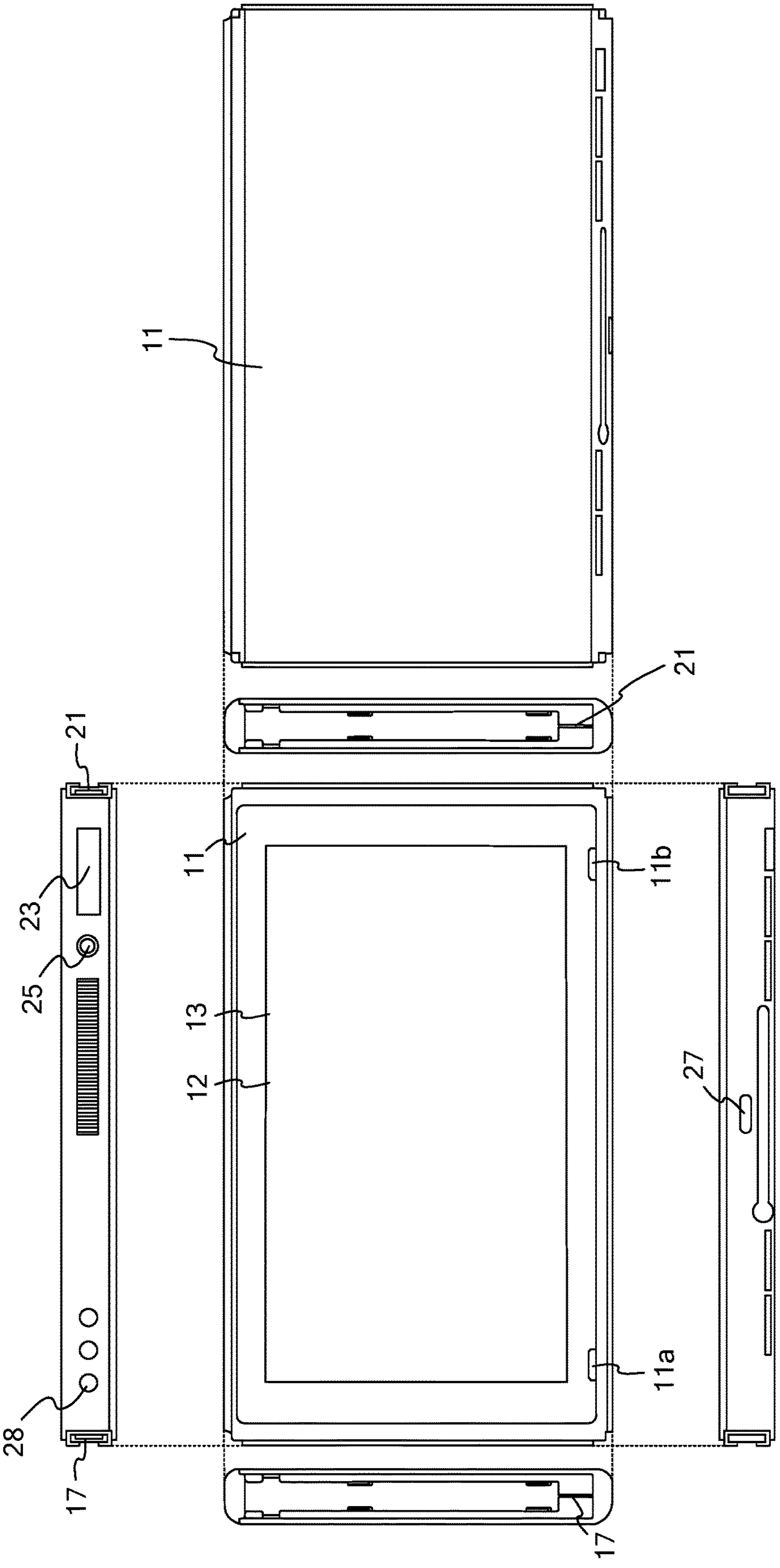
FIG. 3 is an example non-limiting six-sided view showing the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

As shown in FIG. 3, the main body apparatus 2 includes the display 12, which is provided on the main surface of the housing 11. The display 12 displays an image generated by the main body apparatus 2.

Further, the main body apparatus 2 includes a touch panel 13 on a screen of the display 12. In the exemplary embodiment, the touch panel 13 is of a type that allows a multi-touch input (e.g., a capacitive type).

The main body apparatus 2 includes speakers (i.e., speakers 88 shown in FIG. 6) within the housing 11. As shown in FIG. 3, speaker holes 11*a* and 11*b* are formed on the main surface of the housing 11.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2.

Figure 4:
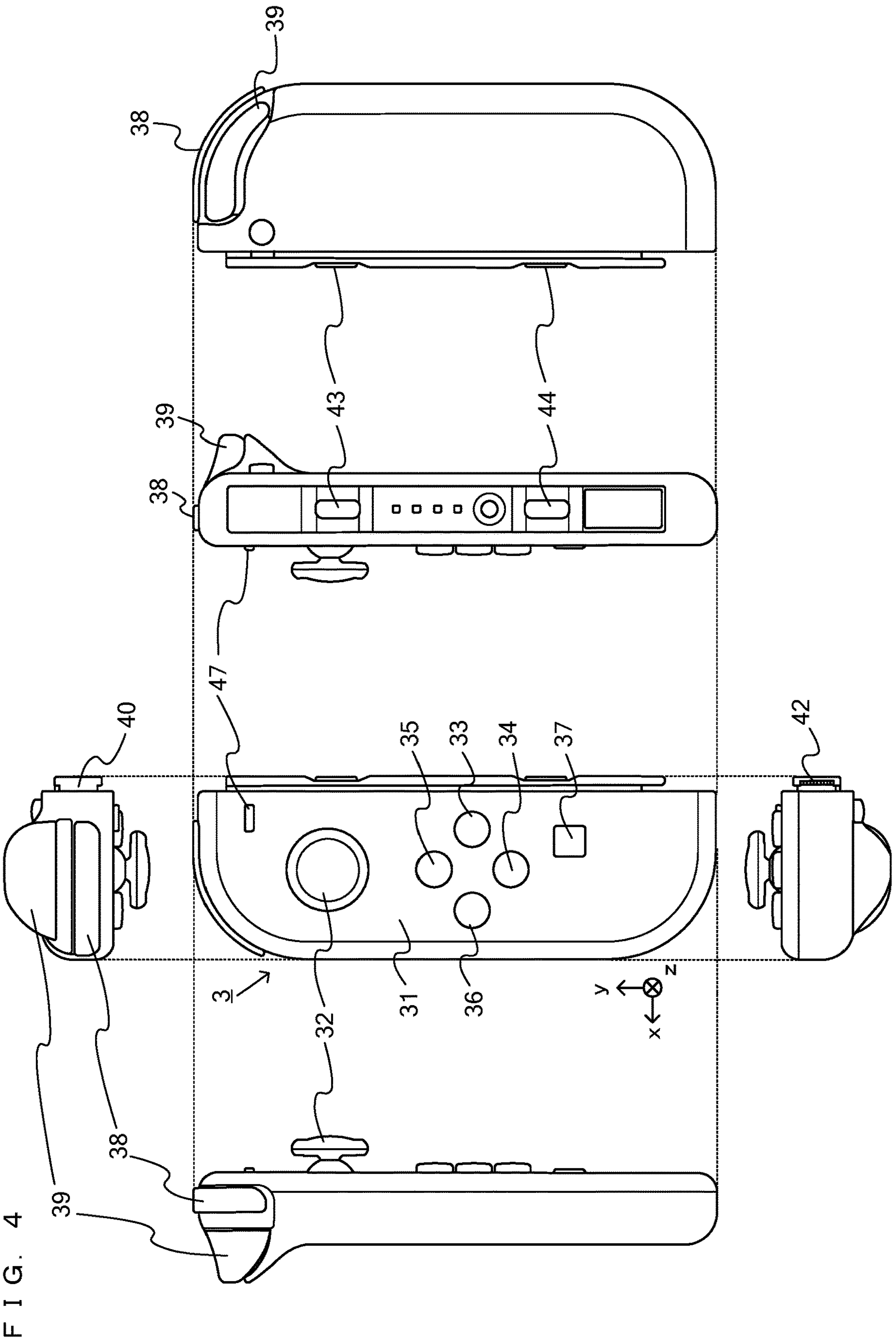
FIG. 4 is an example non-limiting six-sided view showing the left controller 3.

FIG. 4 is six orthogonal views showing an example of the left controller 3. As shown in FIG. 4, the left controller 3 includes a housing 31.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
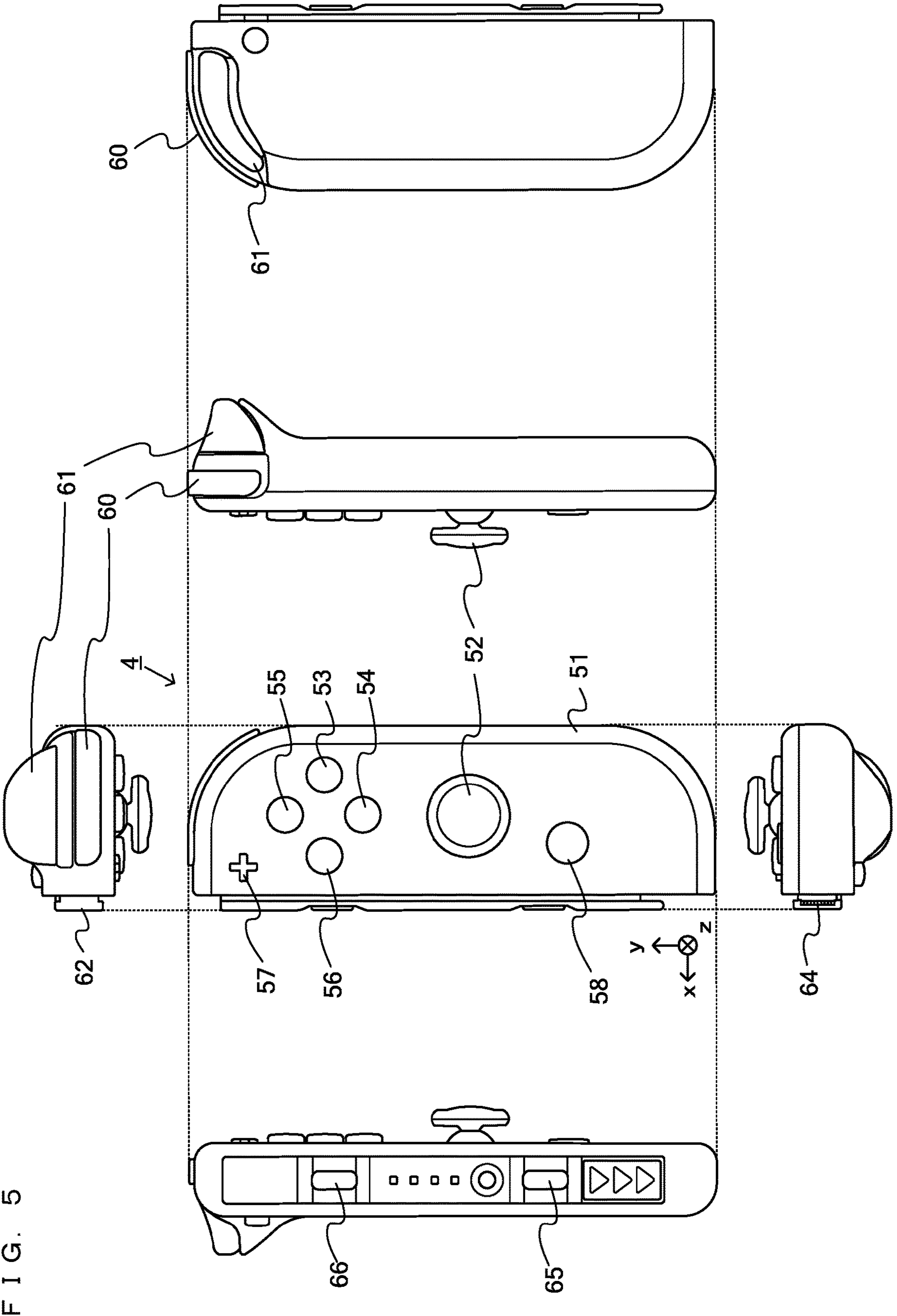
FIG. 5 is an example non-limiting six-sided view showing the right controller 4.

FIG. 5 is six orthogonal views showing an example of the right controller 4. As shown in FIG. 5, the right controller 4 includes a housing 51.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
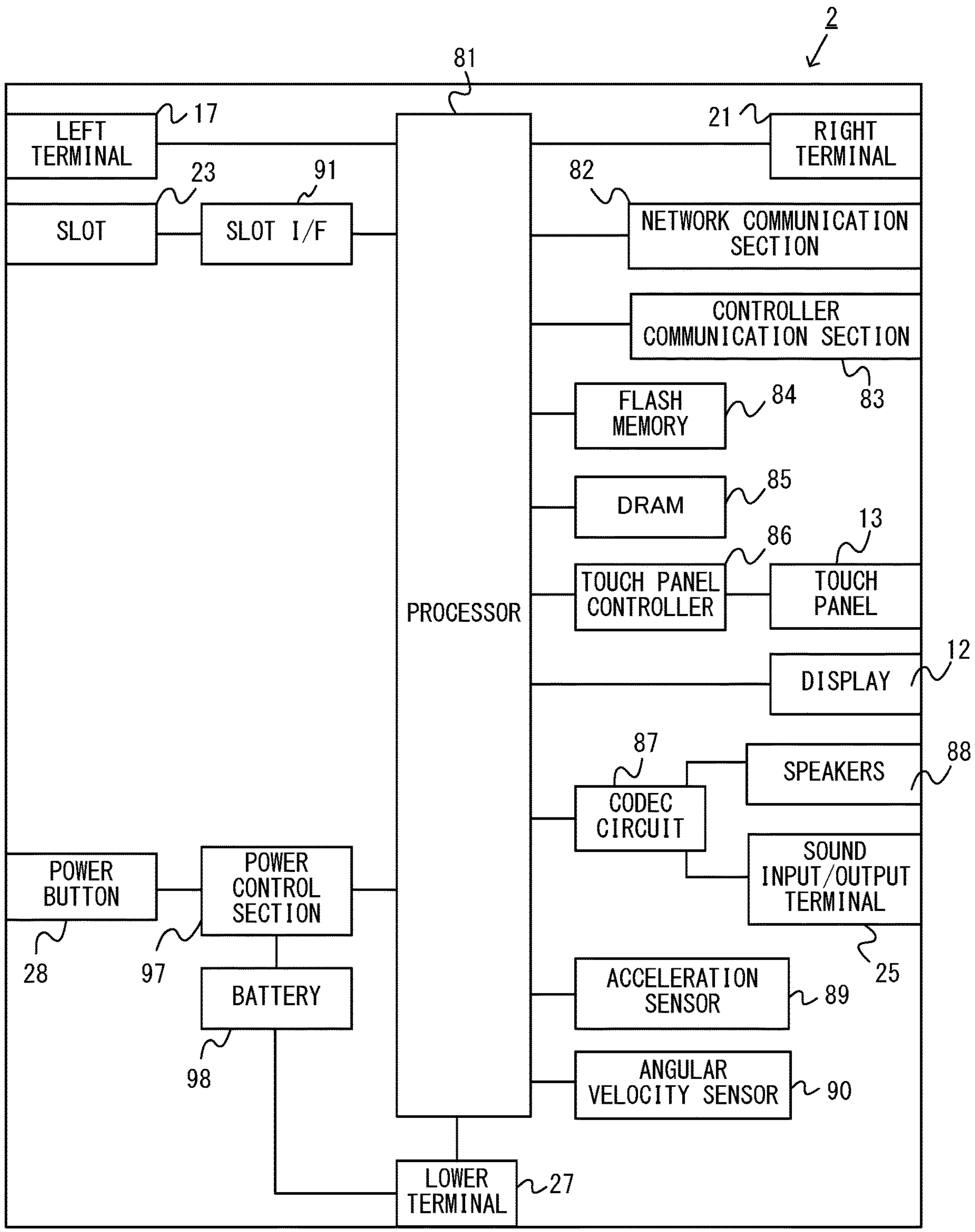
FIG. 6 is an example non-limiting diagram showing an exemplary internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication).

The main body apparatus 2 includes a controller communication section 83. The controller communication section 83 is connected to the processor 81. The controller communication section 83 wirelessly communicates with the left controller 3 and/or the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81.

Figure 7:
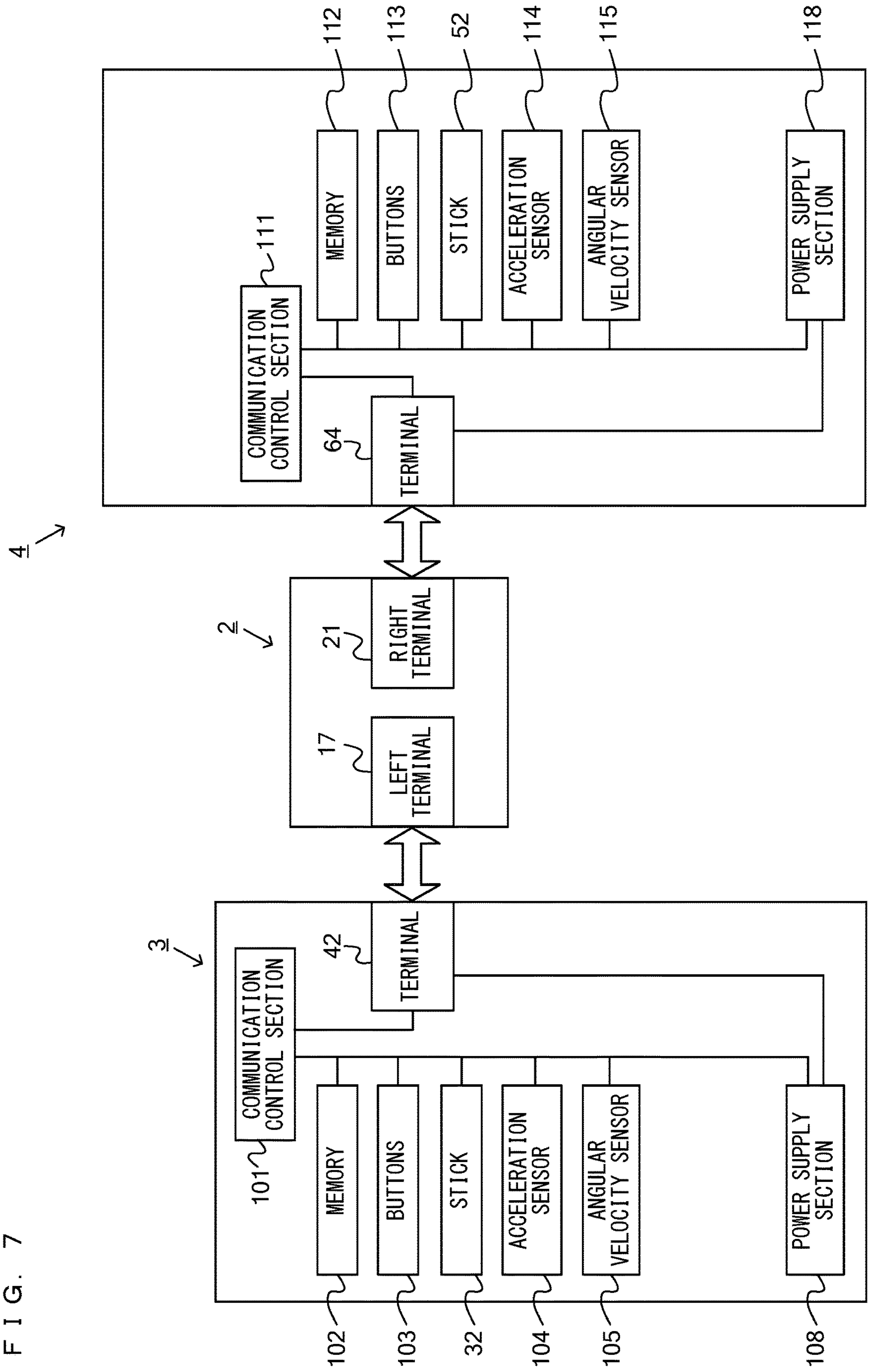
FIG. 7 is an example non-limiting diagram showing exemplary internal configurations of the main body apparatus 2, the left controller 3 and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

(Overview of Game Processing)

The following describes a game of this exemplary embodiment. In the game of this exemplary embodiment, a user character PC is arranged in a virtual space (gaming space) and the game is progressed by having the user character PC moving in the virtual space, making a predetermined action, or defeating an enemy character. In the virtual space, a virtual camera is arranged. The virtual camera is configured to include the user character PC within its capturing range. By using the virtual camera, a game image including the user character PC is generated and displayed on the display 12 or a stationary monitor.

Figure 8:
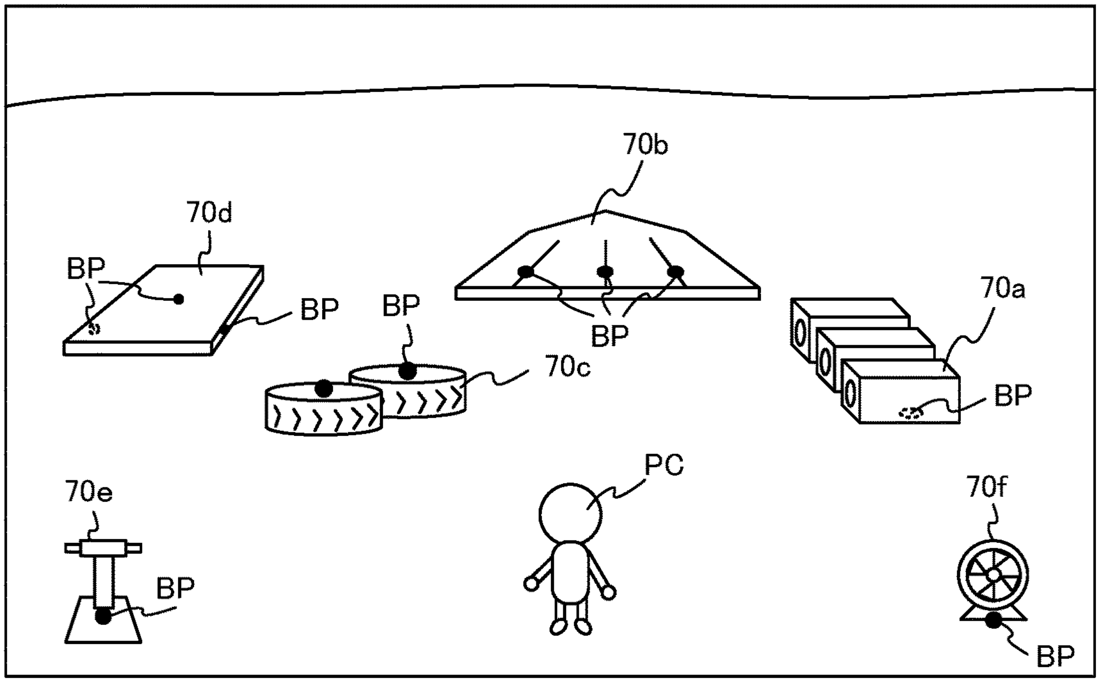
FIG. 8 is an example non-limiting diagram showing an exemplary game image displayed in a case where a game of an exemplary embodiment is executed.
Figure 9:
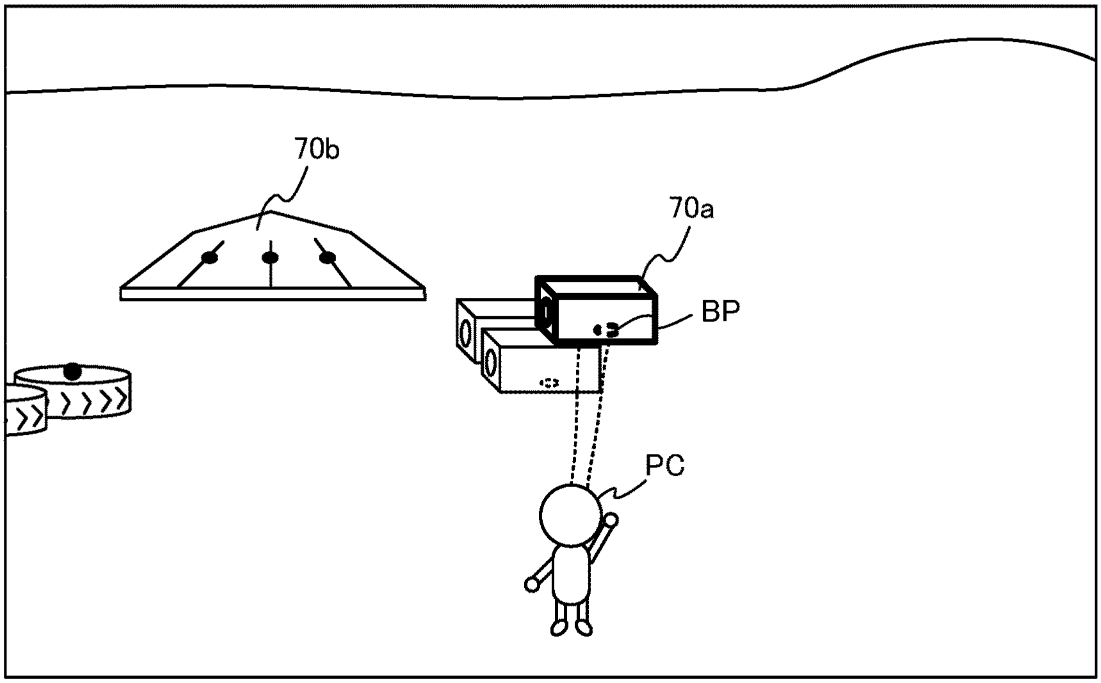
FIG. 9 is an example non-limiting diagram showing how an airplane object 75 is generated, as an exemplary assembled object.

FIG. 8 is a diagram showing an exemplary game image displayed when a game of this exemplary embodiment is executed. As shown in FIG. 8, the user character PC and a plurality of virtual objects 70 (70*a* to 70*f*) are arranged in the virtual space. Further, although illustration is omitted, the virtual space also includes objects such as trees and buildings that are fixed in the virtual space.

The user character PC is a character to be operated by a user. The user character PC moves in the virtual space or makes a predetermined action in the virtual space in response to an input to the controller (3 or 4). The user character PC creates an assembled object by assembling a plurality of virtual objects 70.

The plurality of virtual objects 70 are objects movable in the virtual space in response to an operation by the user and are objects that can be assembled with one another. By assembling the plurality of virtual objects 70 with one another, each of the virtual objects 70 constitutes a part of an assembled object. For example, the plurality of virtual objects 70 are arranged in advance on the ground of the virtual space. The plurality of virtual objects 70 may appear in the virtual space based on an operation by the user. For example, the virtual objects 70 may appear in the virtual space when the user character PC defeats an enemy character or when the user character PC clears a predetermined task. Further, the plurality of virtual objects 70 may be managed as items owned by the user character PC, which are accommodated in a virtual accommodation area of the user character PC, and do not have to be arranged in the virtual space, in a normal occasion. The virtual objects 70 stored in the accommodation area may appear in the virtual space when the user performs an operation.

The user can generate an assembled object by assembling the plurality of virtual objects 70. For example, as an assembled object, the user can generate a movable object movable in the virtual space such as a vehicle, a tank, an airplane, and the user can progress the game by using such an assembled object generated. For example, the user can use the assembled object generated to move in the virtual space or to attack an enemy character.

For example, the plurality of virtual objects 70 include an engine object 70*a*, a wing object 70*b*, wheel objects 70*c*, a plate object 70*d*, a control stick object 70*e*, and a fan object 70*f*. In addition to these objects, another virtual object for constructing the assembled object may be further prepared.

The engine object 70*a* is an object simulating a jet engine and is an exemplary virtual power object having power. The engine object 70*a*, when configured as a part of the assembled object, provides power to the entire assembled object. Specifically, the engine object 70*a* provides a predetermined speed for the assembled object. The wing object 70*b* is a virtual object for flying in the sky, and generates a lifting force when moved in the virtual space at a predetermined speed or faster.

The wheel objects 70*c* are exemplary virtual power objects having power, and are objects that can constitute, for example, wheels of a vehicle. The wheel objects 70*c* are rotatable in a predetermined direction. The wheel objects 70*c* provide a predetermined speed to the assembled object. The plate object 70*d* is a planar virtual object. For example, the plate object 70*d* can be used as a vehicle body.

An operation state of the virtual power object (hereinafter, simply referred to as "power object" in some cases) may be in an ON state or an OFF state. The power object is normally set to the OFF state. The power object can be in the ON state whether it is configured as a part of the assembled object or not configured as a part of the assembled object. For example, in response to an operation by the user, the user character PC makes a predetermined action to the power object. Examples of such a predetermined action include getting close to the power object and hitting the power object or shooting an arrow to the power object. With the predetermined action of the user character PC, the power object is set to the ON state. The power object operates upon transition to the ON state.

For example, in a case where the engine object 70*a* is not assembled as a part of the assembled object and is arranged in the virtual space, the engine object 70*a* is set to the ON state when the user character PC makes a predetermined action to the engine object 70*a*. The engine object 70*a*, upon turning to the ON state, blows out a flame from the injection port, and the engine object 70*a* moves in the direction opposite to the direction in which the flame is blown out. The flame may be subjected to an attack determination. When the user character PC performs a predetermined action to stop the engine object 70*a* (for example, an operation of shooting an arrow), the engine object 70*a* turns to the OFF state and stops.

Further, when the user character PC makes a predetermined action to the wheel objects 70*c* while the wheel objects 70*c* do not constitute parts of the assembled object and are arranged in the virtual space in a standing up posture (that is, the wheels are arranged with their axes parallel to the ground of the virtual space), the wheel objects 70*c* turn to the ON state. In this case, the wheel object 70*c* rotates in a predetermined direction and moves on the ground of the virtual space. When the user character PC performs a predetermined action to stop the wheel object 70*c* (for example, an operation of shooting an arrow), the wheel object 70*c* turns to the OFF state and stops.

Note that powerless wheel objects having no power may be provided in addition to the wheel objects 70*c*. For example, the powerless wheel object is assembled with the plate object 70*d* to form a vehicle object as an assembled object. The vehicle object having the powerless wheel objects is moved by the gravity acting in the virtual space or other power (e.g., by the wheel objects 70*c* included in the vehicle object). When the vehicle object moves on the ground in the virtual space, friction occurs between the vehicle object and the ground. In this case, the friction between the powerless wheel objects and the ground may be smaller than the friction between the wheel objects 70*c* and the ground. Such a powerless wheel object enables a smooth movement on the ground in the virtual space.

The control stick object 70*e* is an exemplary virtual controller object, and when assembled as a part of an assembled object, controls the movement of the assembled object. For example, the control stick object 70*e* has a rectangular bottom surface and a handle part extending upward from the bottom surface.

The control stick object 70*e* has a function of controlling the ON/OFF of the power object in the assembled object, and a function of turning the assembled object. During a control stick operation mode, the control stick object 70*e* is operated by the user character PC in the virtual space. Specifically, when a user performs a predetermined operation to the controller (e.g., pressing an A-button 53) while the user character PC is on the assembled object, a transition to the control stick operation mode occurs and the user character PC moves to the position of the control stick object 70_e_. More specifically, transition to the control stick operation mode occurs in response to a predetermined operation performed while the user character PC is on the assembled object and while the user character PC is within a predetermined range including the control stick object 70_e_. When the user character PC is at the position of the control stick object 70_e_, the operation states of all the power objects in the assembled object are set to the ON state simultaneously. Operating the power object provides the assembled object with a thrust (speed) in a predetermined direction, thus moving the assembled object in the virtual space by the thrust in the predetermined traveling direction. Further, for example, when the user performs a predetermined turning operation to the controller while the user character PC is at the position of the control stick object 70_e_ in the assembled object, the assembled object makes a turn. The control of the movement of the assembled object by using the control stick object 70_e_ is detailed later.

The fan object 70_f_ is an object simulating a fan and is an exemplary virtual power object having power. The fan object 70_f_, when assembled as part of the assembled object, provides power to the entire assembled object. The power of the fan object 70_f_ is weaker than the power of the engine object 70_a_, and gives a speed smaller than the engine object 70_a_ to the assembled object.

As shown in FIG. 8, each of the virtual objects 70 may have one or more preferential connection parts BP. Each of the preferential connection parts BP is a part to be connected preferentially over the other parts when the virtual objects 70 are connected with one another. The preferential connection part BP is preset in each of the virtual objects 70 by a game creator. For example, one preferential connection part BP is set on the bottom surface of the engine object 70_a_. Further, three preferential connection parts BP are set on the upper surface of the wing object 70_b_. Further, a plurality of preferential connection parts BP are set on the upper surface and a side surface of the plate object 70_d_. Further, one or more preferential connection parts BP are also set on each of the wheel objects 70_c_ and the control stick object 70_e_.

Two virtual objects 70 may be connected to (bond with) each other at parts other than their preferential connection parts. Further, a preferential connection part BP of a virtual object may connect to a part of another virtual object other than its preferential connection part. When a preferential connection part BP of one virtual object and a preferential connection part BP of another virtual object are, for example, within a predetermined distance, the preferential connection part BP of the one virtual object and the preferential connection part BP of the other virtual object are preferentially connected to each other. When the preferential connection part BP of the one virtual object and the preferential connection part BP of the other virtual object are spaced farther than the predetermined distance, the one virtual object and the other virtual object are connected to each other at, for example, their parts closest to each other.

The plurality of virtual objects 70 being "connected" to each other means the plurality of virtual objects 70 behave as a single object while being close proximity to each other. For example, if two virtual objects 70 are bonded with each other, the two virtual objects 70 may contact each other. When two virtual objects 70 are bonded with each other, the two virtual objects 70 do not have to be strictly in contact with each other. For example, a gap or another connecting object may be interposed between the two virtual objects 70. The wording "plurality of virtual objects 70 behave as a single object" means that the plurality of virtual objects 70 move within the virtual space and change posture while maintaining the relative positional relation of the plurality of virtual objects 70, so that the virtual objects 70 move as if they are a single object.

Further, an assembled object in which a plurality of virtual objects 70 are "assembled" means a group of virtual objects 70 which are connected to one another, and hence the positional relation of the plurality of virtual objects 70 does not change.

The user can generate an assembled object in which a plurality of virtual objects 70 are connected, by selecting any one of the virtual objects 70 arranged in the virtual space and connecting the selected one of the virtual objects 70 with another virtual object 70. FIG. 9 to FIG. 13 are diagrams showing how the airplane object 75 is generated, as an exemplary assembled object.

Figure 10:
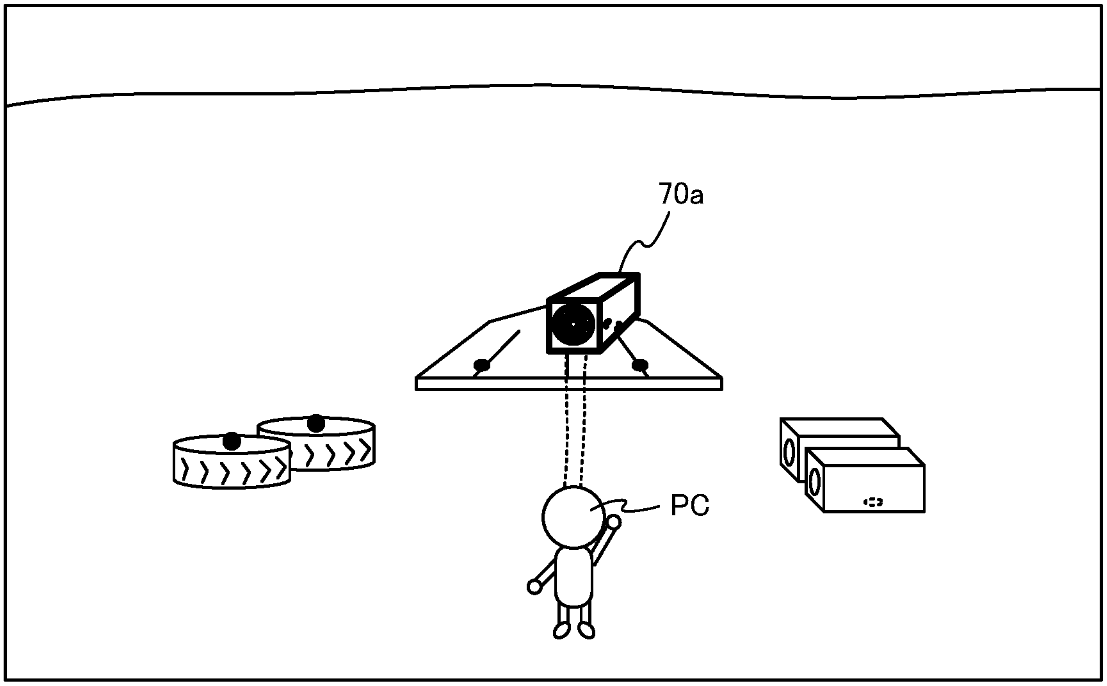
FIG. 10 is an example non-limiting diagram showing how the airplane object 75 is generated, as the exemplary assembled object.

For example, the user selects an engine object 70_a_ arranged in the virtual space (see FIG. 9), and moves the selected engine object 70_a_ (selected object) to the vicinity of a wing object 70_b_ (FIG. 10). For example, a virtual object 70 arranged in the virtual space may be selected by matching an indication marking (not shown) displayed at the center of the screen with the virtual objects 70, and pressing a predetermined button of the left controller 3. The selected object may move together with the user character PC. The selected object may move in such a manner as to maintain its positional relationship with the user character PC. For example, the user character PC and the selected object may move according to a direction input from the analog stick 32 of the left controller 3. Further, for example, according to a direction input from the analog stick 52 of the right controller 4, the user character PC and the virtual camera may change their directions and the selected object may be moved. Further, the selected object may be moved even if the position of the user character PC is not changed. For example, the selected object may be moved according to a change in the direction of the user character PC so that the selected object is positioned in front of the user character PC. Further, the selected object may move when the distance between the user character PC and the selected object changes. For example, when the direction of the user character PC is changed upward in the virtual space, the selected object may move upward in the virtual space. When the user character PC faces upward in the virtual space, the distance between the user character PC and the selected object may be longer than the distance when the user character PC faces a direction parallel to the ground. Further, the virtual camera is controlled so as to include the user character PC and the selected object within its shooting range. Therefore, when the selected object moves in the virtual space according to the movement of the user character PC or a change in the posture of the user character PC, the movement of the selected object is displayed.

Figure 11:
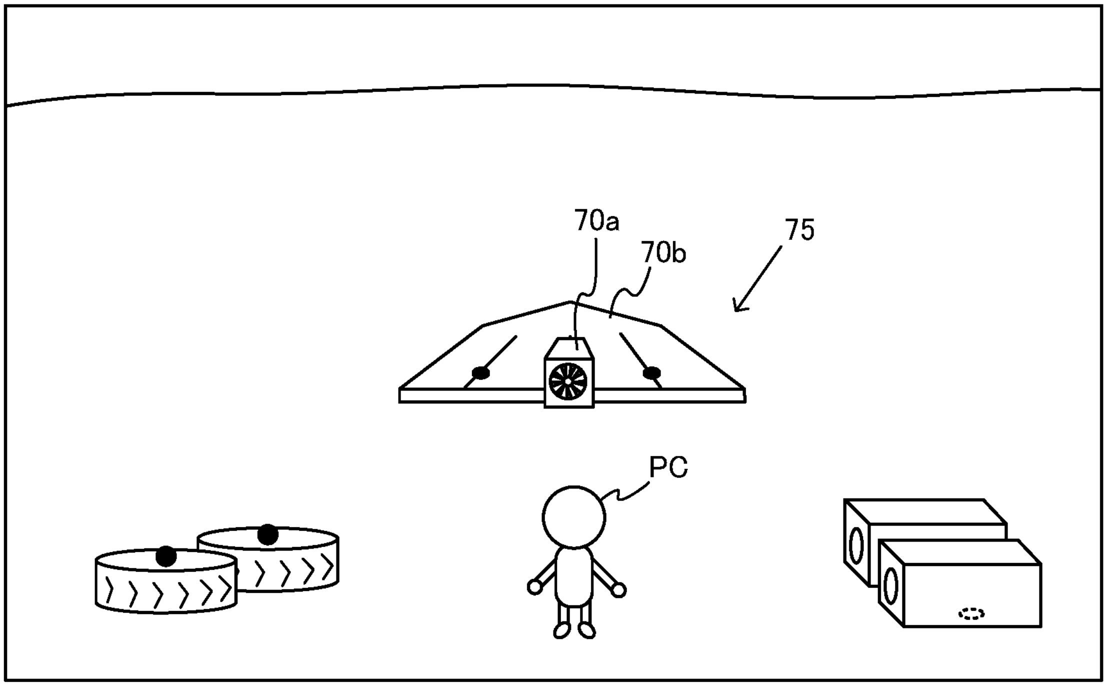
FIG. 11 is an example non-limiting diagram showing how the airplane object 75 is generated, as the exemplary assembled object.
Figure 12:
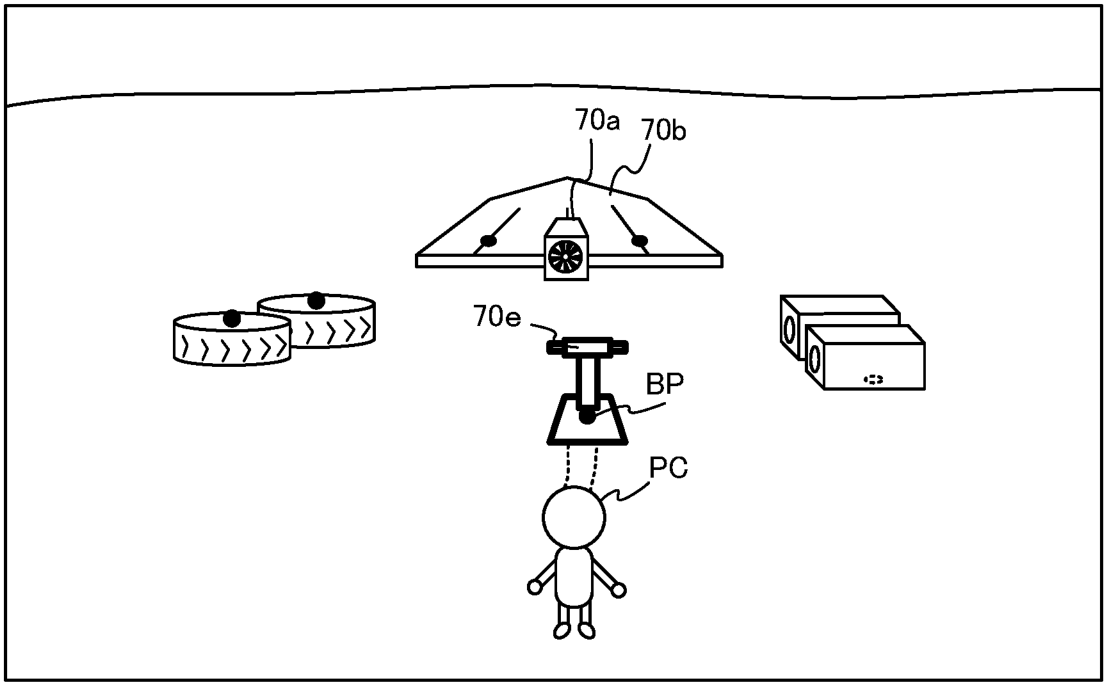
FIG. 12 is an example non-limiting diagram showing how the airplane object 75 is generated, as the exemplary assembled object.

When the engine object 70_a_ is moved so that the positional relation between the engine object 70_a_ and the wing object 70_b_ satisfies a predetermined connecting condition, the engine object 70_a_ and the wing object 70_b_ are connectable to each other. When the user instructs connection (e.g., pressing a predetermined button on the right controller 4) during this state, the engine object 70_a_ and the wing object 70_b_ are connected to each other. This way, an assembled object 75 including the engine object 70_a_ and the wing object 70_b_ is generated (FIG. 11).

The user further selects a control stick object 70_e_ arranged in the virtual space (FIG. 12), and moves the selected control stick object 70_e_ to the vicinity of the wing object 70_b_. Then, a positional relation between the control stick object 70*e* and the wing object 70*b* satisfies a predetermined connecting condition, and the control stick object 70*e* is connected to the upper surface of the wing object 70*b* in response to an instruction for connection given by the user. This way, an airplane object 75, as an assembled object, including the engine object 70*a*, the wing object 70*b*, and the control stick object 70*e* is generated (FIG. 13).

The control stick object 70*e* may be arranged in any position on the upper surface of the wing object 70*b*. Specifically, the control stick object 70*e* is preferentially arranged at the preferential connection part BP of the wing object 70*b*, if the preferential connection part BP set at the bottom surface of the control stick object 70*e* is within a predetermined distance from the preferential connection part BP set on the upper surface of the wing object 70*b*. To the contrary, if the distance between the preferential connection part BP set at the bottom surface of the control stick object 70*e* and the preferential connection part BP set on the upper surface of the wing object 70*b* are more than the predetermined distance, the control stick object 70*e* is arranged at a user-instructed position on the upper surface of the wing object 70*b*.

The control stick object 70*e* has a direction. The control stick object 70*e* is oriented in a length direction of the bottom surface of the control stick object 70*e*. In FIG. 13, the control stick object 70*e* is arranged so that its direction matches with the direction of the wing object 70*b*. Specifically, the direction of the control stick object 70*e* and that of the wing object 70*b* are in a depth direction of FIG. 13. The user can designate the direction of the control stick object 70*e*. For example, the user can arrange the control stick object 70*e* on the upper surface of the wing object 70*b* so that the control stick object 70*e* has a predetermined angle with respect to the orientation of the wing object 70*b*. The predetermined angle may be any value within the range of 0 degrees to 180 degrees, or may be any one of a plurality of predetermined values (e.g., 45 degrees, 90 degrees, 75 degrees, 180 degrees).

Figure 13:
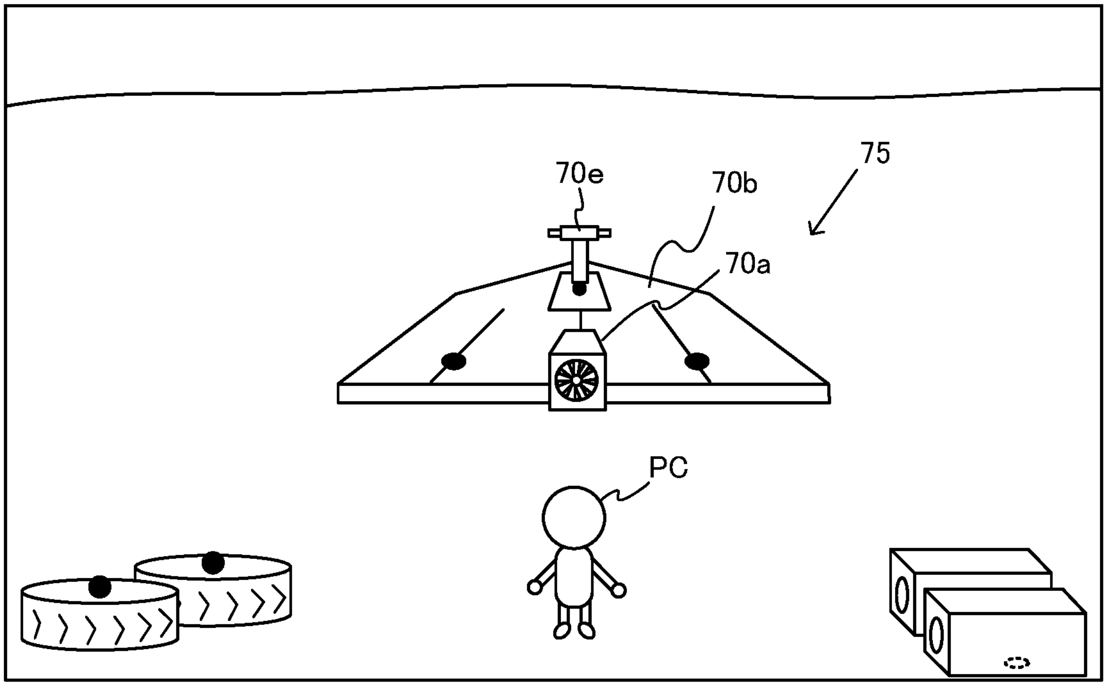
FIG. 13 is an example non-limiting diagram showing how the airplane object 75 is generated, as the exemplary assembled object.

Note that yet another virtual object 70 may be connected to the airplane object 75 shown in FIG. 13. For example, two or more engine objects 70*a* may be connected to the wing object 70*b*. In this case, the speed of the airplane object 75 having two or more engine objects 70*a* become faster. Further, another wing object 70*b* may be connected to the wing object 70*b* to form a large wing in which two wing objects 70*b* are integrated with each other. An airplane object 75 having two wing objects 70*b* can generate a greater lifting force and is capable of flying with a heavier object thereon.

Figure 14:
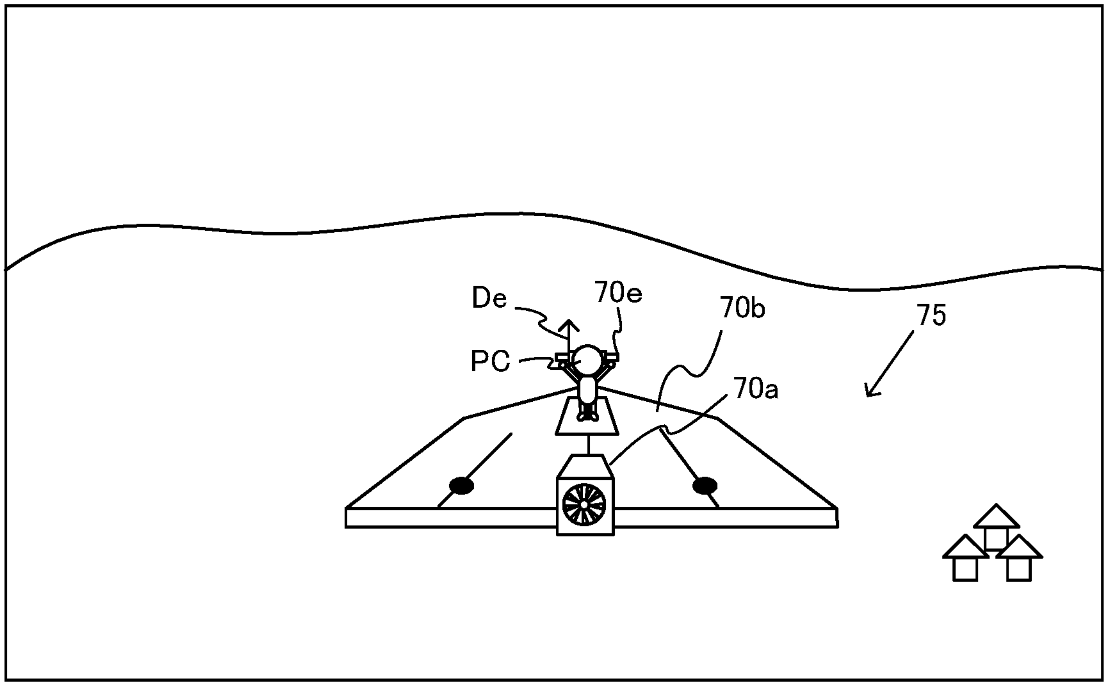
FIG. 14 is an example non-limiting diagram showing an exemplary state where a user character PC flies in the sky of a virtual space on the airplane object 75 including a control stick object 70*e*.

FIG. 14 is a diagram showing an exemplary state where the user character PC flies in the sky of the virtual space on the airplane object 75 including the control stick object 70*e*.

As shown in FIG. 14, the user can move the user character PC in the virtual space, on the airplane object 75 generated by assembling a plurality of virtual objects 70. Specifically, after the airplane object 75 is generated, the user places the user character PC on the airplane object 75 by using the controller (3 or 4). A transition to the control stick operation mode occurs when an operation is performed on the controller to set the control stick object 70*e* as an operation target (e.g., pressing the A-button 53), while the user character PC is on the airplane object 75 and the user character PC is at a position corresponding to the control stick object 70*e* (within a predetermined range including the control stick object 70*e*). Specifically, the user character PC moves to the position of the control stick object 70*e*. When the user character PC moves to the position of the control stick object 70*e*, the user character PC holds the handle part of the control stick object 70*e*, and makes a movement that looks as if the user character PC is operating the handle part of the control stick object 70*e*.

The airplane object 75 is controllable while the user character PC is at the position of the control stick object 70*e*. Specifically, while the user character PC is at the position of the control stick object 70*e*, the engine object 70*a* as an exemplary power object is in the ON state. The operation states of the power objects include the ON state that provides a thrust to the assembled object and the OFF state that provides no thrust to the assembled object. The engine object 70*a* is set to the ON state, in response to the user character PC moving to the position of the control stick object 70*e* (that is, when the control stick object 70*e* is set as the operation target).

Note that, in a case where the airplane object 75 includes a plurality of power objects, all the power objects are simultaneously set to the ON state, in response to the user character PC moving to the position of the control stick object 70*e*. For example, in a case where the airplane object 75 includes a plurality of engine objects 70*a*, all the engine objects 70*a* are set to the ON state simultaneously. Further, in a case where the airplane object 75 includes an engine object 70*a* and a fan object 70*f*, the engine object 70*a* and the fan object 70*f* are set to the ON state simultaneously.

The engine object 70*a* during the ON state gives power to the airplane object 75. Thus, the airplane object 75 flies and moves in the virtual space in a predetermined traveling direction, at a predetermined speed. The traveling direction of the airplane object 75 depends on the position and the direction of the engine object 70*a*. For example, in a case where the engine object 70*a* on the wing object 70*b* is centered relative to the lateral direction of the wing object 70*b* and oriented in the same direction as the direction of the wing object 70*b* as shown in FIG. 14, the traveling direction of the airplane object 75 is the same as the direction in which the wing object 70*b* is oriented. In this case, the airplane object 75 travels straight in the direction towards the depth of the screen, as shown in FIG. 14. At this time, the direction De of the control stick object 70*e* is the depth direction of the screen.

In a case where the user character PC is at the position of the control stick object 70*e*, the moving direction of the airplane object 75 changes when the user performs a direction input operation (e.g., input of a direction using the analog stick 32). Specifically, the airplane object 75 rotates leftward or rightward (in the yaw direction) or upward or downward (in the pitch direction) in response to the direction input operation.

Figure 15:
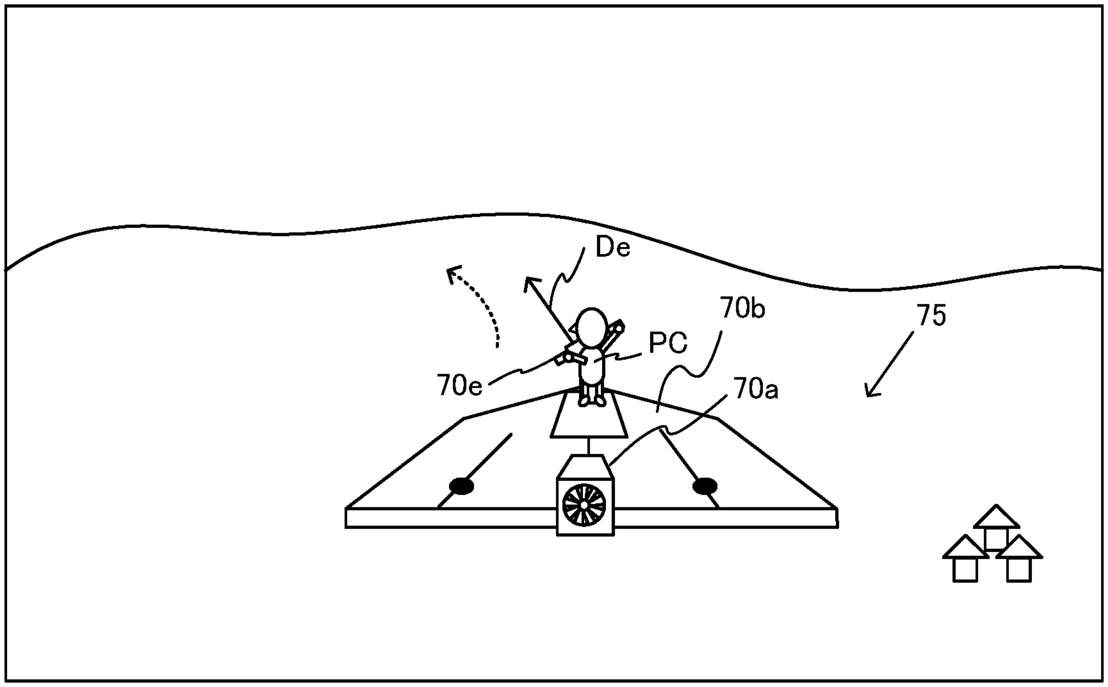
FIG. 15 is an example non-limiting diagram showing an exemplary state where the airplane object 75 makes a left turn.
Figure 16:
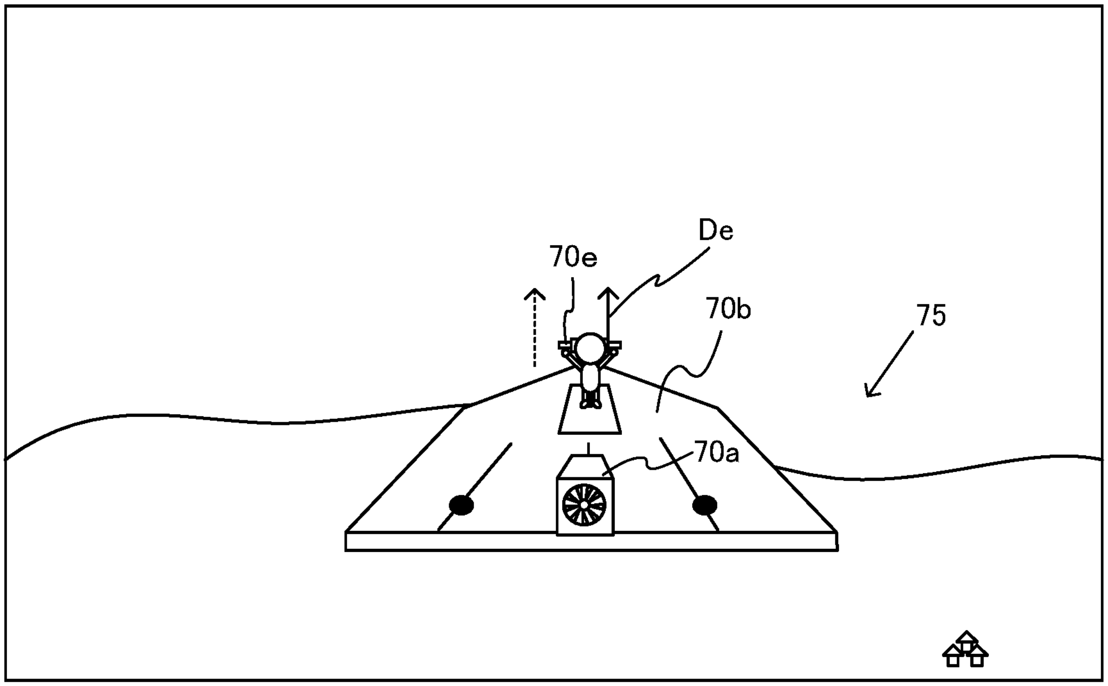
FIG. 16 is an example non-limiting diagram showing an exemplary state where the airplane object 75 heads upward and rises.

FIG. 15 is a diagram showing an exemplary state where the airplane object 75 makes a left turn. FIG. 16 is a diagram showing an exemplary state where the airplane object 75 heads upward and rises.

As shown in FIG. 15, when the user inputs the left direction on the analog stick 32 while the user character PC is at the position of the control stick object 70*e*, the user character PC turning the handle part of the control stick object 70*e* to the left direction is displayed, and the direction De of the handle part of the control stick object 70*e* is turned to the left. The airplane object 75 then makes a left turn. To the contrary, when the right direction is input on the analog stick 32, the handle part of the control stick object 70*e* is turned to the right and the airplane object 75 makes a right turn. Specifically, a rotating speed with the center of gravity of the airplane object 75 as the reference is given to each virtual object constituting the airplane object 75. As a result, the entire airplane object 75 is turned.

Note that the direction of the control stick object 70*e* itself (the length direction of the bottom surface of the control stick object 70*e*) does not change even if the direction of the handle part of the control stick object 70*e* is changed. That is, the direction of the control stick object 70*e* itself is fixed with respect to the assembled object, when the control stick object 70*e* is assembled as a part of the assembled object. However, the direction De of the handle part of the control stick object 70*e* changes in response to an operation by the user while the user character PC is at the position of the control stick object 70*e*. Note that the direction of the control stick object 70*e* itself may change in response to an operation by the user while the user character PC is at the position of the control stick object 70*e*, and the moving direction of the airplane object 75 may change accordingly.

Further, as shown in FIG. 16, when the user inputs the downward direction on the analog stick 32 while the user character PC is at the position of the control stick object 70*e*, the user character PC pulling the handle part of the control stick object 70*e* towards the user character PC is displayed, and the direction De of the handle part of the control stick object 70*e* is turned upward. Then, the airplane object 75 heads upward and rises. To the contrary, when the upward direction is input on the analog stick 32, the handle part of the control stick object 70*e* is turned downward and the airplane object 75 heads downward and goes down.

Note that, for example, in a case where the position of the engine object 70*a* deviates to the right from the center of the wing object 70*b*, the traveling direction of the airplane object 75 deviates leftward from the direction of the wing object 70*b*. In this case, the airplane object 75 makes a left turn, even without the direction input operation by the user. The user performing the direction input operation during this state changes the traveling direction of the airplane object 75. For example, when the left direction is input by the user, leftward rotation is given to the airplane object 75, and the traveling direction of the airplane object 75 turns further to the left, thus resulting in a steeper left turn. To the contrary, when the right direction is input by the user, the airplane object 75 is rotated to the right. When this rightward rotation of the airplane object 75 caused by the direction input operation by the user is greater than the leftward deviation in the traveling direction caused by the engine object 70*a*, the airplane object 75 makes a right turn. When the rightward rotation of the airplane object 75 caused by the direction input operation by the user is equal to the leftward deviation in the traveling direction caused by the engine object 70*a*, the airplane object 75 travels straight forward.

The user can create various movable objects other than the airplane object 75, which includes the control stick object 70*e*, and have the user character PC travel on the movable object within the virtual space.

Further, in the exemplary embodiment, the term "movable object" refers to an assembled object composed of a plurality of virtual objects 70 and is an object movable within the virtual space. The movable object encompasses a movable assembled object including a power object and a movable assembled object without a power object.

Figure 17:
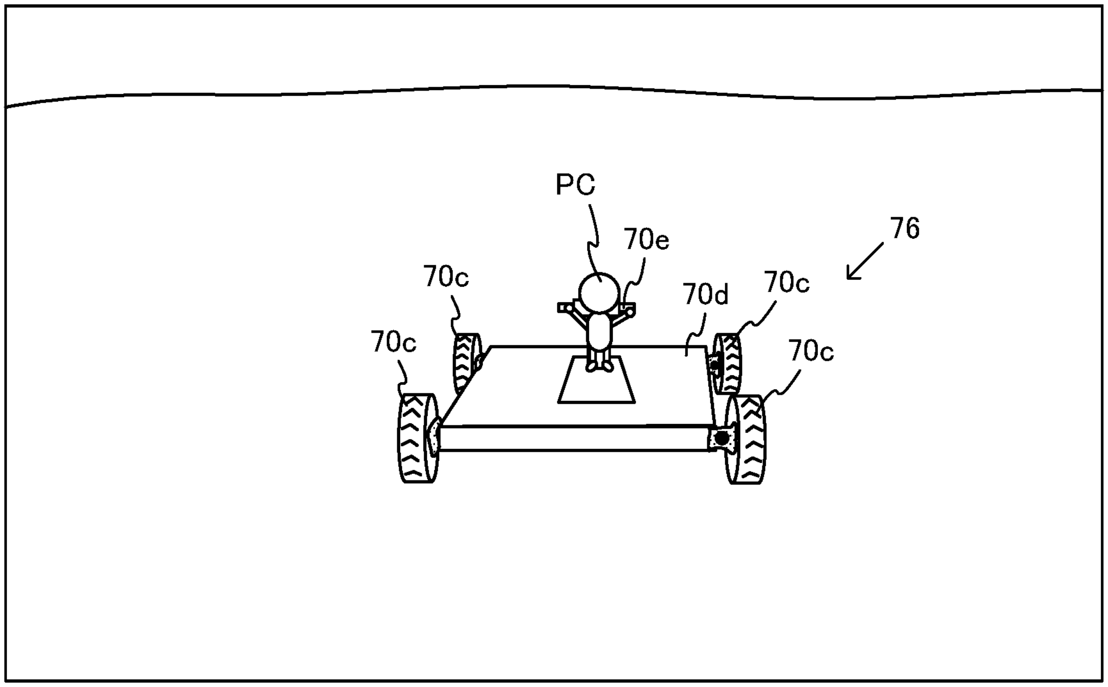
FIG. 17 is an example non-limiting diagram showing a state where the user character PC rides on a 4-wheeled vehicle object 76 as an assembled object, and travels on the ground in a virtual space.

FIG. 17 is a diagram showing a state where the user character PC rides on a 4-wheeled vehicle object 76 as an assembled object, and travels on the ground in the virtual space.

First, the user generates the 4-wheeled vehicle object 76 by assembling the plate object 70*d* with the control stick object 70*e* and four wheel objects 70*c* arranged in the virtual space. The user places the user character PC on the 4-wheeled vehicle object 76, and performs an operation to set the control stick object 70*e* as the operation target. Then, the user character PC moves to the position of the control stick object 70*e*. At this time, each of the wheel objects 70*c* turns to the ON state. Each of the wheel objects 70*c* is a type of power object, and alone provides power to the assembled object. The four wheel objects 70*c* turn to the ON state when the user character PC moves to the position of the control stick object 70*e*. As a result, the 4-wheeled vehicle object 76 travels straight in the depth direction, within the virtual space.

Figure 18:
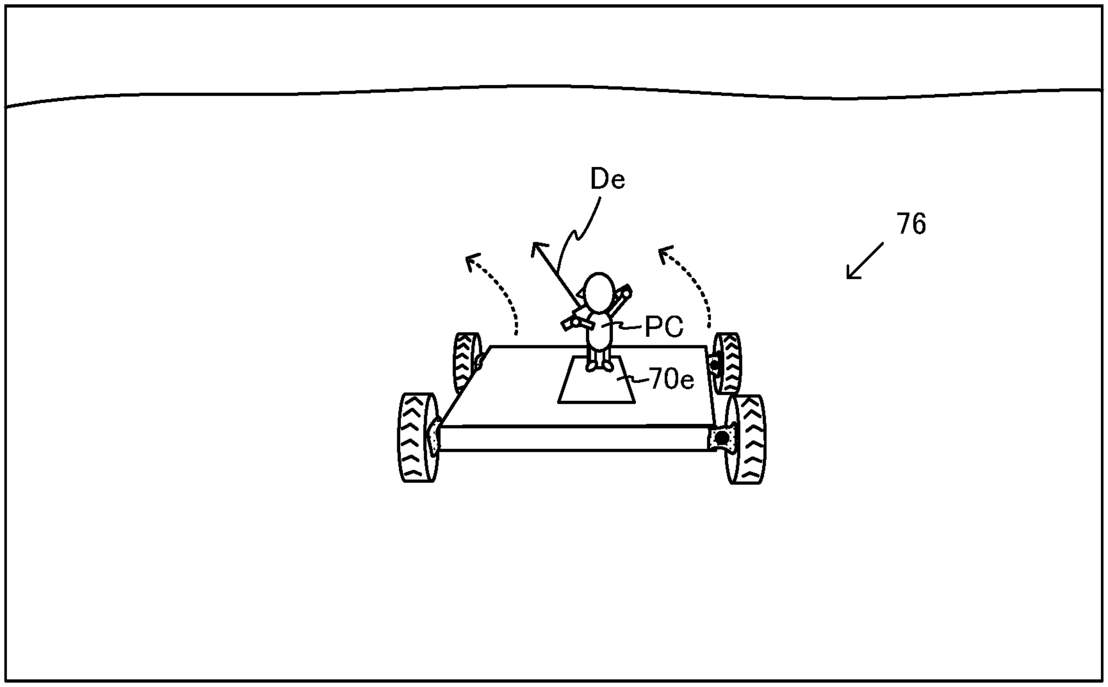
FIG. 18 is an example non-limiting diagram showing an exemplary state where the 4-wheeled vehicle object 76 makes a left turn.
Figure 19:
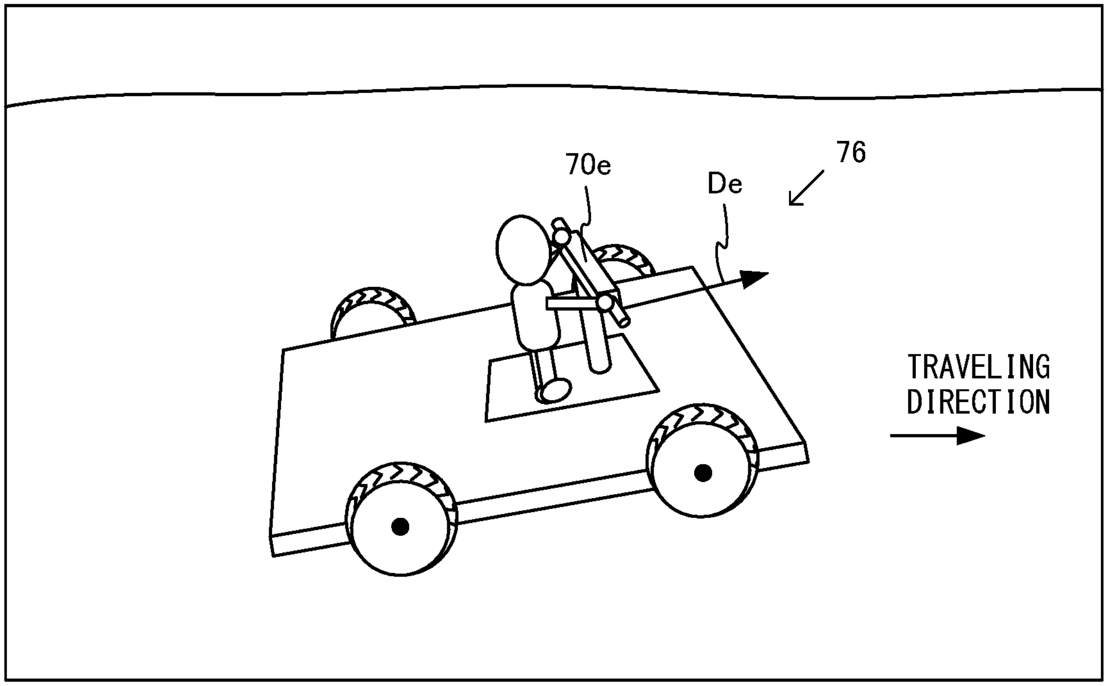
FIG. 19 is an example non-limiting diagram showing an exemplary state where the 4-wheeled vehicle object 76 heads upward.

FIG. 18 is a diagram showing an exemplary state where the 4-wheeled vehicle object 76 makes a left turn. FIG. 19 is a diagram showing an exemplary state where the 4-wheeled vehicle object 76 heads upward.

As shown in FIG. 18, when the user inputs the left direction on the analog stick 32 while the user character PC is at the position of the control stick object 70*e*, the user character PC turning the control stick object 70*e* to the left direction is displayed, and the direction De of the control stick object 70*e* is turned to the left. The 4-wheeled vehicle object 76 then makes a left turn. This is reversed when the right direction is input on the analog stick 32.

Further, as shown in FIG. 19, when the user inputs the downward direction on the analog stick 32 while the user character PC is at the position of the control stick object 70*e*, the user character PC pulling the control stick object 70*e* towards the user character PC is displayed, and the direction De of the control stick object 70*e* is turned upward. Then, the 4-wheeled vehicle object 76 heads upward and performs a wheelie.

As described, the control stick object 70*e* can be incorporated into various assembled objects that are capable of moving in the virtual space. When the control stick object 70*e* is incorporated into an assembled object as a part of the assembled object, the movement of the assembled object can be controlled by the control stick object 70*e*. Specifically, the control stick object 70*e* controls the ON/OFF of the power object in the assembled object. The control stick object 70*e* further controls rotation of the assembled object in the yaw direction or the pitch direction. The movement of the assembled object is controlled by controlling the ON/OFF of the power object, and rotation of the assembled object in the yaw direction or the pitch direction.

Note that, in the above description, each of the power objects in the assembled object is set to the ON state, when the user character PC moves to the position of the control stick object 70*e*. However, each of the power objects in the assembled object may be set to the ON state, in response to a predetermined operation performed by the user, while the user character PC is at the position of the control stick object 70*e*. That is, each of the power objects in the assembled object may be set to the ON state in response to an operation by the user after transition to the control stick operation mode.

Further, in the above description, the user generates an assembled object including the power object and the control stick object 70*e*. However, the user may generate an assembled object including the power object but not including the control stick object 70*e*. When the user character PC makes a predetermined action to the assembled object not including the control stick object 70*e* (e.g., shooting an arrow to the assembled object), the power object in the assembled object operates, thus causing the assembled object to move. Specifically, in a case where a vehicle object including four wheel objects 70*c* but not including the control stick object 70*e* is generated as the assembled object, the user can move the vehicle object by individually activating (turning to the ON state) each of the wheel objects 70*c*. Specifically, the user can individually activate each of the wheel objects 70*c* by having the user character PC shoot an arrow one by one to hit each of the wheel objects 70*c*. When the four wheel objects 70*c* operates, the vehicle object moves forward. By placing the user character PC on the vehicle object, the user character PC can move in the virtual space. However, the user is not able to turn the vehicle object, because the vehicle object does not include the control stick object 70*e*.

As described, in a case where the assembled object does not include the control stick object 70*e*, the user needs to activate, one by one, the power objects included in the assembled object. This is cumbersome for the user. For example, in a case of successively activating the power objects, the user may have a difficulty to perform a predetermined action to the power objects because the assembled object moves. However, an assembled object including the control stick object 70*e* improves the convenience, because such an assembled object allows the user to activate all the power objects in the assembled object simultaneously.

Further, the user may generate an assembled object including the control stick object 70*e* but not including the power object. Such an assembled object including the control stick object 70*e* but not including the power object is described later.

Figure 20:
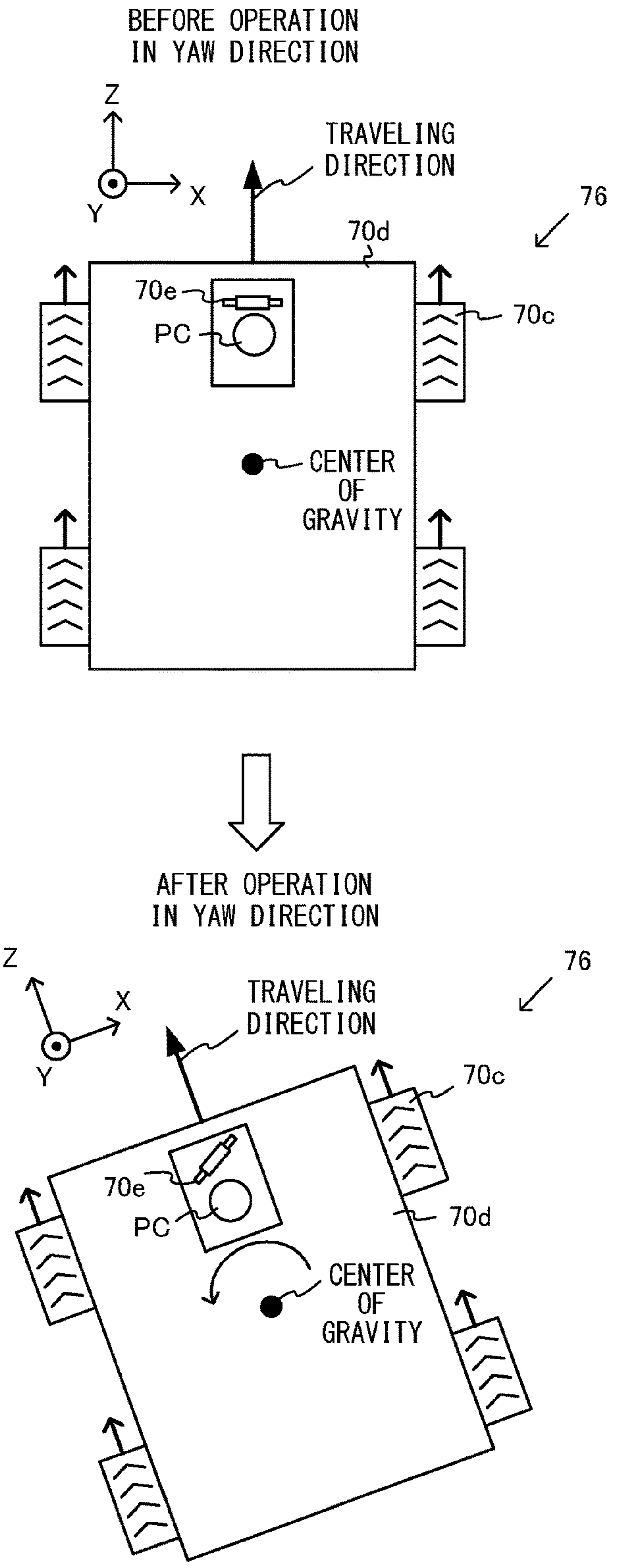
FIG. 20 is an example non-limiting diagram explaining a rotation of the 4-wheeled vehicle object 76 in the yaw direction, by using a control stick object 70*e*.

Next, using the 4-wheeled vehicle object 76 as an example, a rotation control of the 4-wheeled vehicle object 76 by using the control stick object 70*e* is described. FIG. 20 is a diagram explaining a rotation of the 4-wheeled vehicle object 76 in the yaw direction, by using a control stick object 70*e*.

FIG. 20 illustrates the 4-wheeled vehicle object 76 as seen from the above of the virtual space. The XYZ coordinate system in FIG. 20 is a coordinate system with the control stick object 70*e* as the reference. The Z-axis indicates the forward of the control stick object 70*e*. The X-axis indicates the rightward direction of the control stick object 70*e*. The Y-axis indicates the upward direction of the control stick object 70*e*. As shown in FIG. 20, the control stick object 70*e* is arranged so that the traveling direction of the 4-wheeled vehicle object 76 coincides with the Z-axis direction of the control stick object 70*e*.

For example, when the control stick object 70*e* is not steered by using the analog stick 32, the 4-wheeled vehicle object 76 moves in a predetermined traveling direction with the four wheel objects 70*c*. The traveling direction of the 4-wheeled vehicle object 76 is determined according to the arrangement of each of the wheel objects 70*c*. When the four wheel objects 70*c* are arranged so that each of the left and right sides of the plate object 70*d* has two wheel objects 70*c* in a balanced manner as shown in FIG. 20, the traveling direction of the 4-wheeled vehicle object 76 is straight forward. Further, the center of gravity is determined in the 4-wheeled vehicle object 76. The center of gravity of the 4-wheeled vehicle object 76 is determined based on the positions and weights of the virtual objects 70 constituting the 4-wheeled vehicle object 76. In the example shown in FIG. 20, the four wheel objects 70*c* are arranged in a well-balanced manner in the front, rear, left, and right sides. Therefore, the center of gravity of the 4-wheeled vehicle object 76 is substantially at the center of the 4-wheeled vehicle object 76.

For example, when the user inputs the left direction by using the analog stick 32, the user character PC steers the handle part of the control stick object 70*e*, and turns the handle part of the control stick object 70*e* to the left, as shown in the lower illustration of FIG. 20. In response to this, the 4-wheeled vehicle object 76 rotates leftward in the yaw direction about the center of gravity. Specifically, a rotating speed is given to each of the virtual objects 70 constituting the 4-wheeled vehicle object 76 so that the 4-wheeled vehicle object 76 rotates leftward about an axis which passes through the center of gravity of the 4-wheeled vehicle object 76 and is parallel to the top-to-bottom axis of the virtual space. More specifically, each of the virtual objects 70 constituting the 4-wheeled vehicle object 76 is given an angular velocity and a speed of translation according to the distance from the center of gravity of the 4-wheeled vehicle object 76. With the speed of the wheel objects 70*c* towards front and the leftward rotating speed in the yaw direction, the entire 4-wheeled vehicle object 76 makes a left turn. Note that, each of the virtual objects 70 constituting the 4-wheeled vehicle object 76 may be given a rotating speed so that the 4-wheeled vehicle object 76 rotates about an axis which passes through the center of gravity of the 4-wheeled vehicle object 76 and is parallel to the Y-axis of the XYZ coordinate system with the control stick object 70*e* as the reference.

Note that the wheel objects 70*c* are each in contact with the ground and hence a friction is generated between the wheel objects 70*c* and the ground. As will be described later, the behavior of an object in the virtual space is determined by calculation according to physical laws. The friction between each object is also taken into account when calculating the behavior of each object. The friction between the wheel objects 70*c* and the ground is set to be a relatively large value while the 4-wheeled vehicle object 76 moves forward (while the control stick object 70*e* is not steered), and the friction between the wheel objects 70*c* and the ground is set to be a relatively small value when the 4-wheeled vehicle object 76 makes a turn (when the control stick object 70*e* is steered). This makes it easy for the entire 4-wheeled vehicle object 76 to rotate in the yaw direction. By reducing the friction between the wheel objects 70*c* and the ground when the 4-wheeled vehicle object 76 makes a turn, the wheel objects 70*c* may slip on the ground. For example, when the 4-wheeled vehicle object 76 makes a turn while it climbs a sloped road, the 4-wheeled vehicle object 76 may slide down due to a reduced friction between the wheel objects 70*c* and the ground. To avoid such a slide down, an amount by which the friction between the wheel objects 70*c* and the ground is reduced may be reduced or set to zero, when the 4-wheeled vehicle object 76 climbs up or go down a sloped road.

Figure 21:
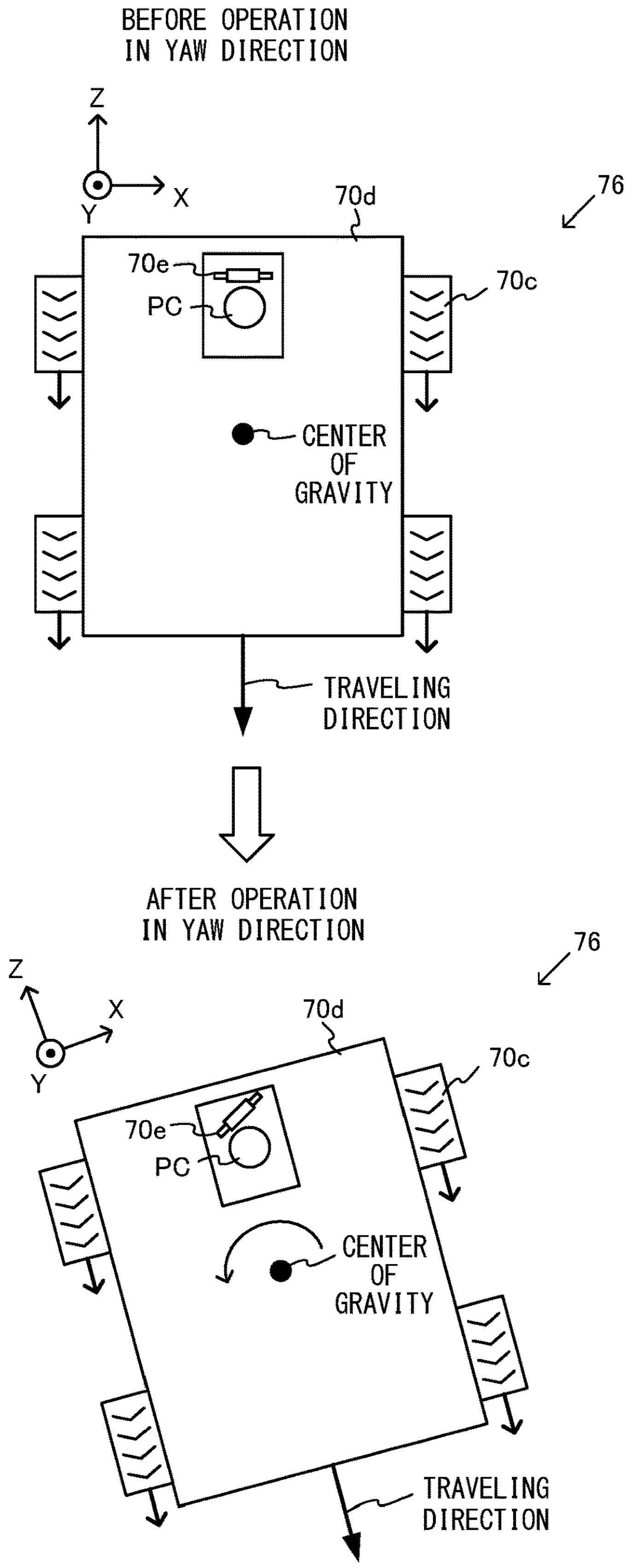
FIG. 21 is an example non-limiting diagram explaining a rotation of the 4-wheeled vehicle object 76 in the yaw direction, in a case where the control stick object 70*e* is arranged in a direction opposite to a traveling direction of the 4-wheeled vehicle object 76.

FIG. 21 is a diagram explaining a rotation of the 4-wheeled vehicle object 76 in the yaw direction, in a case where the control stick object 70*e* is arranged in a direction opposite to a traveling direction of the 4-wheeled vehicle object 76.

As shown in FIG. 21, the control stick object 70*e* is arranged on the 4-wheeled vehicle object 76 so that the direction of the control stick object 70*e* (Z-axis direction) is exactly the opposite to the traveling direction of the 4-wheeled vehicle object 76. In such a configuration of the assembled object, the 4-wheeled vehicle object 76 travels in a direction opposite to the direction in which the control stick object 70*e* is oriented while the control stick object 70*e* is not steered by using the analog stick 32 (it appears that the 4-wheeled vehicle object 76 is traveling rearward, when viewed from the user character PC).

For example, when the user inputs the left direction by using the analog stick 32, the user character PC steers the control stick object 70*e* and turns the handle part of the control stick object 70*e* to the left, as shown in the lower illustration of FIG. 21. In response to this, the 4-wheeled vehicle object 76 rotates leftward in the yaw direction about the center of gravity, as in the case of FIG. 20. With the speed of the wheel objects 70*c* rearward and the leftward rotating speed in the yaw direction, the 4-wheeled vehicle object 76 moves in a rear right direction, where the forward is the direction in which the control stick object 70*e* is oriented (when the traveling direction of the 4-wheeled vehicle object 76 is used as the reference, the 4-wheeled vehicle object 76 turns to the left).

The similar control is performed, irrespective of the position on the 4-wheeled vehicle object 76 where the control stick object 70*e* is arranged and irrespective of the direction of the control stick object 70*e* with respect to the 4-wheeled vehicle object 76. For example, when the user inputs the left direction, the handle part of the control stick object 70*e* turns to the left about the control stick object 70*e*, and the 4-wheeled vehicle object 76 rotates leftward in the yaw direction about its center of gravity. This is reversed when the user inputs the right direction. That is, the user-input direction matches with the change in the direction of the handle part of the control stick object 70*e* and the rotating direction in the yaw direction of the 4-wheeled vehicle object 76, and these are not variable depending on the position and the direction of the control stick object 70*e* on the 4-wheeled vehicle object 76.

A weight is also set for the control stick object 70*e*, and the center of gravity of the 4-wheeled vehicle object 76 varies depending on the position of the control stick object 70*e* on the 4-wheeled vehicle object 76. Since each of the virtual objects constituting the 4-wheeled vehicle object 76 rotates about the center of gravity, how the 4-wheeled vehicle object 76 rotates slightly varies depending on the position of the control stick object 70*e* on the 4-wheeled vehicle object 76. However, irrespective of the position on the 4-wheeled vehicle object 76 where the control stick object 70*e* is arranged, the relation between the user-input direction and the steering direction of the control stick object 70*e* and the rotating direction of the 4-wheeled vehicle object 76 does not change. For example, as shown in FIG. 20 and FIG. 21, steering the control stick object 70*e* to the left direction causes the 4-wheeled vehicle object 76 to rotate in the left direction about its center of gravity. Note that a weight does not have to be set for the control stick object 70*e*, and the center of gravity of the 4-wheeled vehicle object 76 does not have to vary irrespective of the position of the control stick object 70*e* on the 4-wheeled vehicle object 76. In such a case, the position of the control stick object 70*e* does not affect the rotation of the 4-wheeled vehicle object 76 in the yaw direction.

Figure 22:
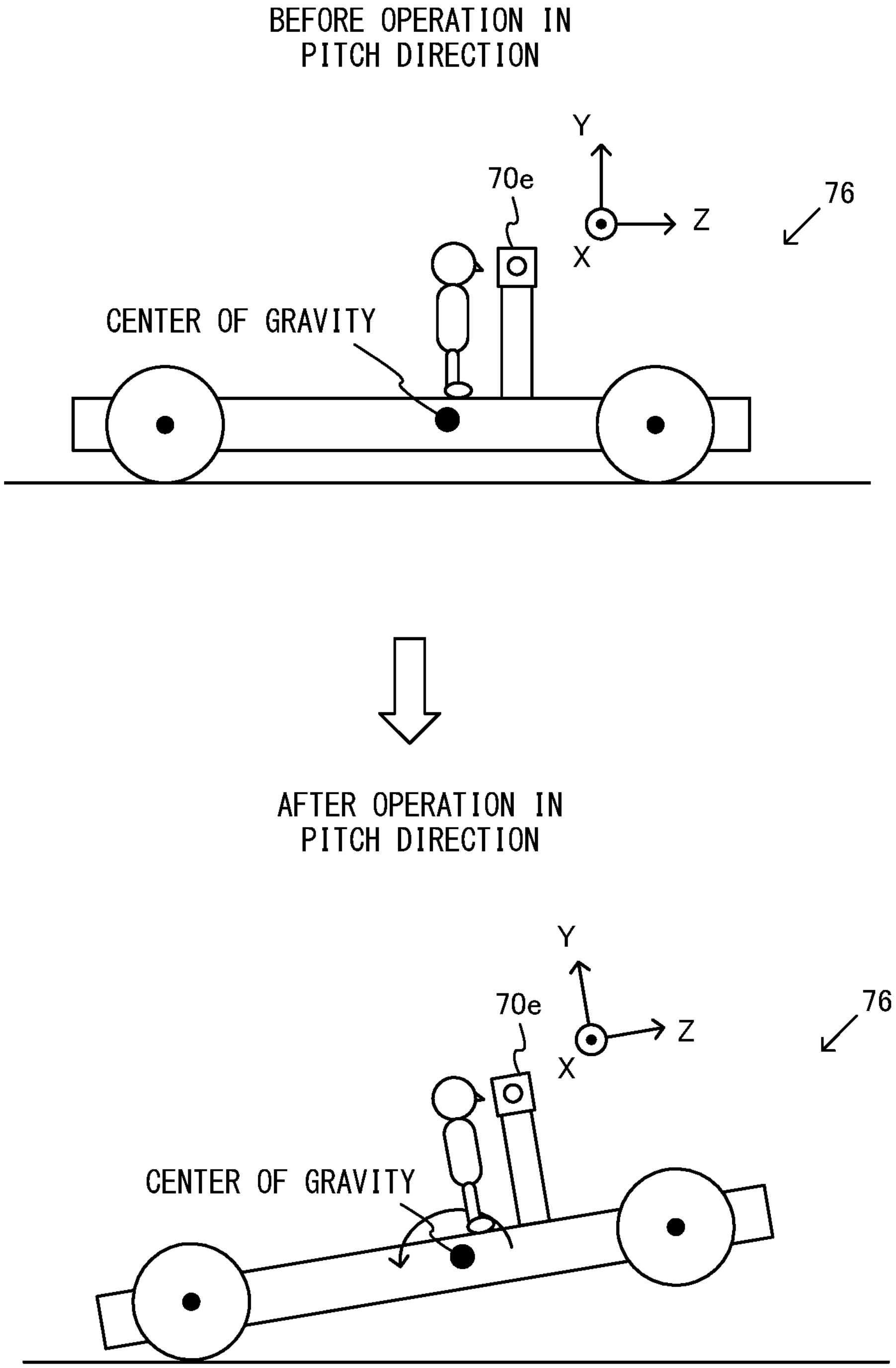
FIG. 22 is an example non-limiting diagram explaining a rotation of the 4-wheeled vehicle object 76 in the pitch direction, by using the control stick object 70*e*.

FIG. 22 is a diagram explaining a rotation of the 4-wheeled vehicle object 76 in the pitch direction, by using a control stick object 70*e*. FIG. 22 illustrates the 4-wheeled vehicle object 76 as seen from a lateral direction of the virtual space.

For example, when the user inputs the downward direction by using the analog stick 32, the user character PC steers the control stick object 70*e* and causes the control stick object 70*e* to face downward when viewed from the user character PC, as shown in the lower illustration of FIG. 22. In response to this, the 4-wheeled vehicle object 76 rotate upward (in a pitch direction), about the center of gravity. Specifically, a rotating speed about the center of gravity of the 4-wheeled vehicle object 76 is given to each of the virtual objects 70 constituting the 4-wheeled vehicle object 76 so that the 4-wheeled vehicle object 76 heads upward in the virtual space. As a result, the entire 4-wheeled vehicle object 76 heads upward and performs a wheelie.

While the description with reference to FIG. 20 to FIG. 22 uses the 4-wheeled vehicle object 76 as an example, the same goes for other assembled objects including the control stick object 70*e*. For example, as shown in FIG. 15, when the airplane object 75 is rotated in the yaw direction, rotation in the yaw directional about the center of gravity is added to the airplane object 75. Further, for example, as shown in FIG. 16, when the airplane object 75 is rotated in the pitch direction, rotation in the pitch direction about the center of gravity is added to the airplane object 75.

Similarly, in an assembled object having the control stick object 70*e* but not having a power object, rotation is given to the assembled object in response to steering of the control stick object 70*e*, although illustration of such a configuration is omitted.

For example, even in a case where the control stick object 70*e* is arranged on the upper surface of the plate object 70*d* thus constituting an assembled object including the plate object 70*d* and the control stick object 70*e*, a rotation is given to the assembled object in response to steering of the control stick object 70*e*. Specifically, for example, in a case where the user inputs the left direction by using the analog stick 32 while the user character PC is at the position of the control stick object 70*e*, the assembled object (each of the virtual objects 70 in the assembled object) is given a leftward rotating speed in the yaw direction about the center of gravity of the assembled object. If the friction between the plate object 70*d* and the ground is a predetermined value or lower, the assembled object rotates leftward in that position.

Further, for example, in a case of an assembled object configured by arranging the control stick object 70*e* on the upper surface of the plate object 70*d*, the assembled object may be floated on the water such as a river or an ocean in the virtual space. In this case, the assembled object does not include a power object. Therefore, the assembled object travels in the virtual space along the flow of the river. Steering the control stick object 70*e* at this time gives rotation to the assembled object. Specifically, the assembled object is given a leftward rotating speed in the yaw direction about its center of gravity. In this case, the assembled object simply rotates in the yaw direction (about the top-to-bottom axis of the virtual space) while traveling along the flow of the river, and the moving direction of the assembled object does not change.

Note that, even if a movable object does not include a power object, the moving direction of the movable object may be changed by steering of the control stick object 70*e*.

Figure 23:
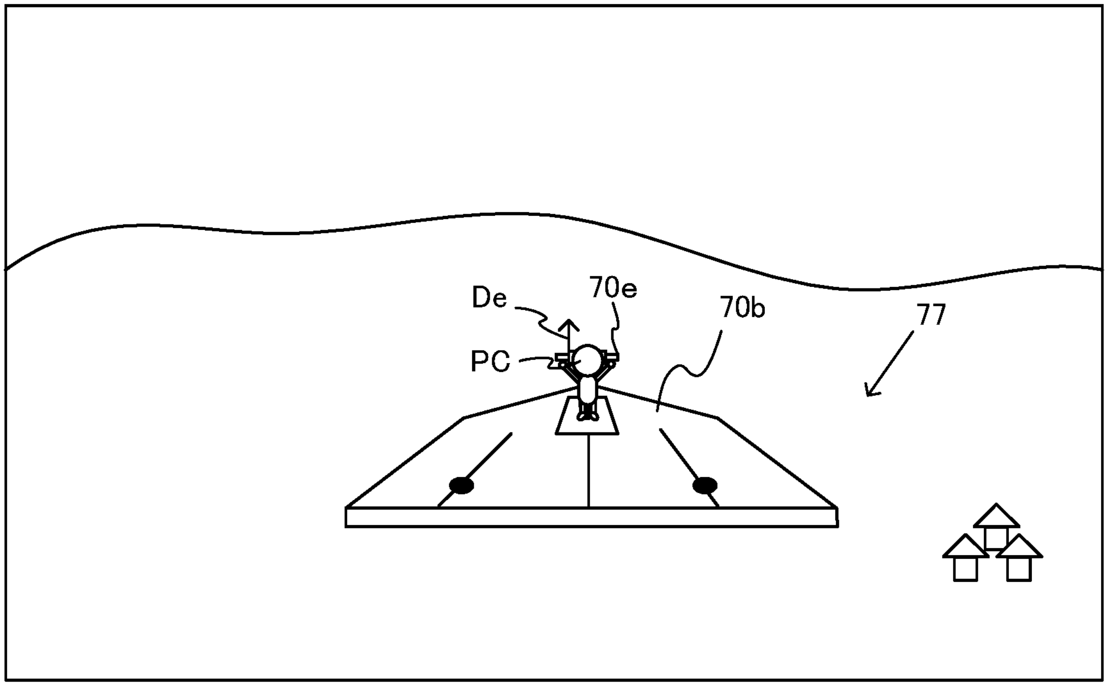
FIG. 23 is an example non-limiting diagram showing an exemplary state where the user character PC travels straight in the virtual space on an airplane object 77 including a wing object 70*b* and the control stick object 70*e*.
Figure 24:
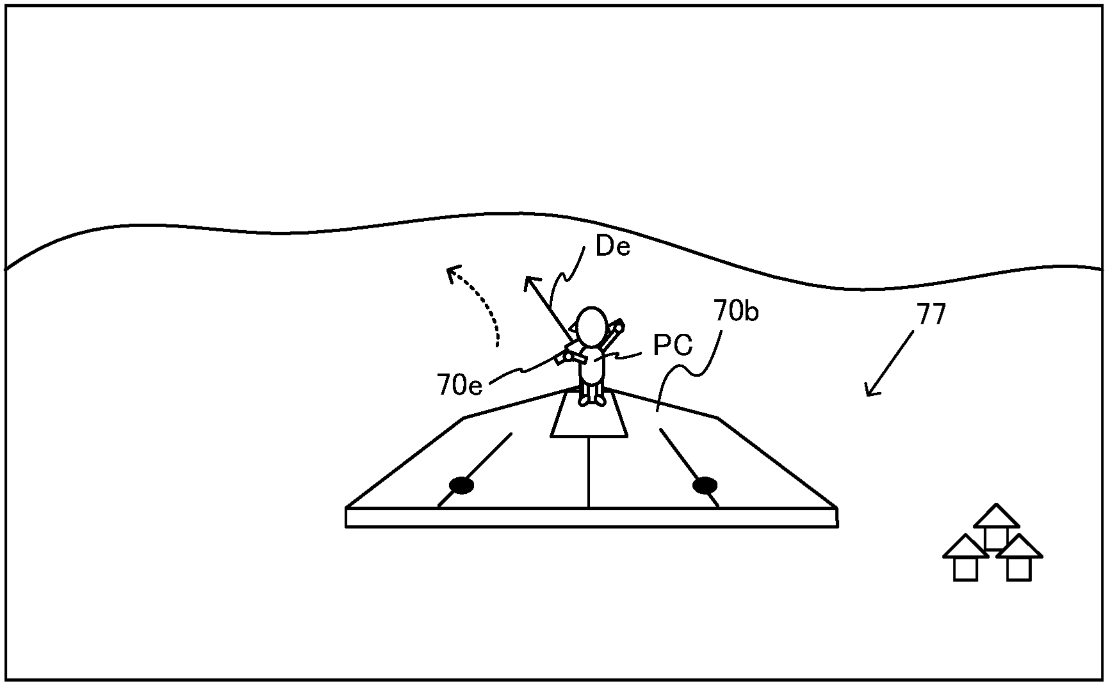
FIG. 24 is an example non-limiting diagram showing an exemplary state where the airplane object 77 makes a left turn in response to steering with the control stick object 70*e*.

FIG. 23 is a diagram showing an exemplary state where the user character PC travels straight in the virtual space on an airplane object 77 including a wing object 70*b* and the control stick object 70*e*. FIG. 24 is a diagram showing an exemplary state where the airplane object 77 makes a left turn in response to steering with the control stick object 70*e*.

As shown in FIG. 23, the airplane object 77 does not include a power object. However, in this exemplary embodiment, a virtual thrust from the rear to the front of the airplane object 77 (in FIG. 23, from the side close to the viewer to the side away from the viewer) is given to the airplane object 77, when the airplane object 77 flies in the sky of the virtual space. That is, the airplane object 77 is controlled as if a power object is provided at the position and oriented as is the engine object 70*a* shown in FIG. 14, although the power object is not displayed on the screen.

For example, as in the above-described configuration, when the user inputs the left direction by using the analog stick 32, the user character PC steers the control stick object 70*e* and turns the handle part of the control stick object 70*e* to the left, as shown in the lower illustration of FIG. 24. In response to this, the airplane object 77 rotates leftward in the yaw direction, about the center of gravity. Then, as the direction of the wing object 70*b* changes to the leftward direction, the direction in which a virtual thrust is given also changes to the left, which causes the airplane object 77 to make a left turn. That is, the airplane object 77 having no power object can be regarded as having a thrust in the traveling direction as in the case of the airplane object 75 having the power object, and the airplane object 77 can be turned through the same control as described above. Specifically, the traveling direction of the airplane object 77 rotates about the center of gravity of the airplane object 77 in response to steering of the handle part of the control stick object 70*e* by the user character PC. Therefore, for example, when the handle part of the control stick object 70*e* is turned to the left or right while the airplane object 77 is moving in the traveling direction, the traveling direction itself changes to turn the airplane object 77 to left or right turn, instead of simply rotating the airplane object 77 in the yaw direction with the traveling direction maintained (i.e., moving forward).

The virtual thrust as described above is set smaller than a thrust given by a power object in a case where the control stick object 70*e* is combined with a power object such as the engine object 70*a* and the fan object 70*f*. This is because such a virtual thrust only needs to be enough for the airplane object 77 to make a turn in response to steering of the handle part of the control stick object 70*e*. Further, it is because the virtual thrust that equals to or surpasses the thrust given by the power object may make the game less amusing and the user is less motivated to combine the power object with the airplane object 77.

With the virtual thrust as described above, the user is able to turn the airplane object 77 by using the control stick object 70*e*, even without the power object. Note that, of the objects having a control stick, the virtual thrust as described above may be given only to the airplane object 75 (a wing object having a control stick object). Alternatively, such a virtual thrust may be given to other vehicle objects. Further, the virtual thrust as described above may be given only in a case where the power object is not provided, or may be given whether a power object is provided or not. Note that, in this exemplary embodiment, the virtual thrust given is directed from the rear of the airplane object 77 towards a predetermined direction in front of the airplane object 77 (in FIG. 23, from the side close to the viewer to the side away from the viewer). This is because the design of the airplane object 77 (or the wing object) allows the user to distinguish one side from the other (front or rear direction) and assume which side is more appropriate as the front. However, in another embodiment, the direction of the virtual thrust may be determined based on the direction of the control stick object, or based on the direction in which the initial speed is given or the direction of the initial movement.

As described hereinabove, this exemplary embodiment allows control of the moving direction of the assembled object by using the control stick object 70*e* included in the assembled object. Specifically, the assembled object is rotated in the yaw direction or in the pitch direction by using the control stick object 70*e*. Note that this exemplary embodiment deals with a case where the assembled object does not rotate in the roll direction by using the control stick object 70*e*; however, in another embodiment, the assembled object may rotate in the roll direction. Further, in the exemplary embodiment, the moving direction of the assembled object is controllable with a control stick object in the assembled object, even if the assembled object includes no object corresponding to a mechanism generally used to control the moving direction of a moving object (e.g., movable wings in an airplane, rudder in a raft, etc.). That is, as long as the assembled object includes the control stick object, the moving direction in which the assembled object moves is controllable. This contributes to excellent usability.

(Posture Correction of Control Stick Object 70*e*)

Next, the following describes correction of a posture of an assembled object including the control stick object 70*e*. As described above, in this exemplary embodiment, an assembled object including the control stick object 70*e* travels in the virtual space in response to an operation by the user. For example, when the airplane object 75 as the assembled object flies in the virtual space, the airplane object 75 flies, for example, under the influence of a wind in the virtual space or collides with a predetermined object within the virtual space during its flight. For example, under the influence of wind, the airplane object 75 rotates in the roll direction or in the pitch direction. When the control stick object 70*e* is steered by the user, the airplane object 75 rotates in the roll direction or the pitch direction. In such a case, the posture of the airplane object 75 is corrected in this exemplary embodiment.

Figure 25:
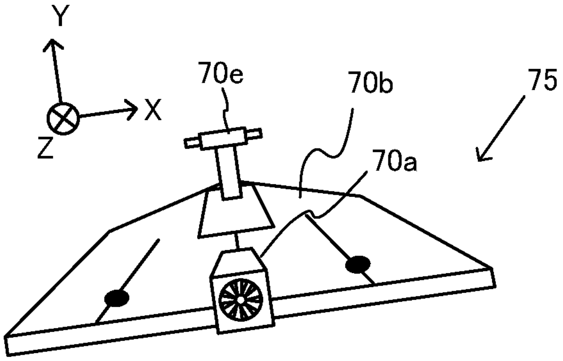
FIG. 25 is an example non-limiting diagram showing an exemplary correction of the posture of the control stick object 70*e* in the roll direction.
Figure 25:
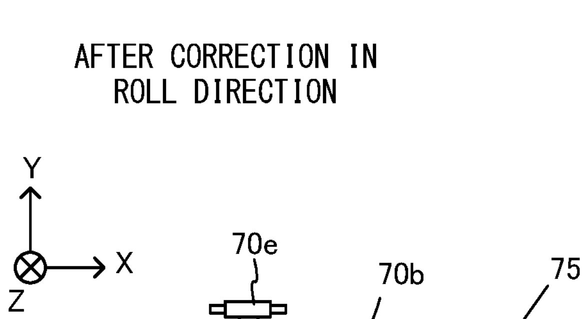
Figure 26:
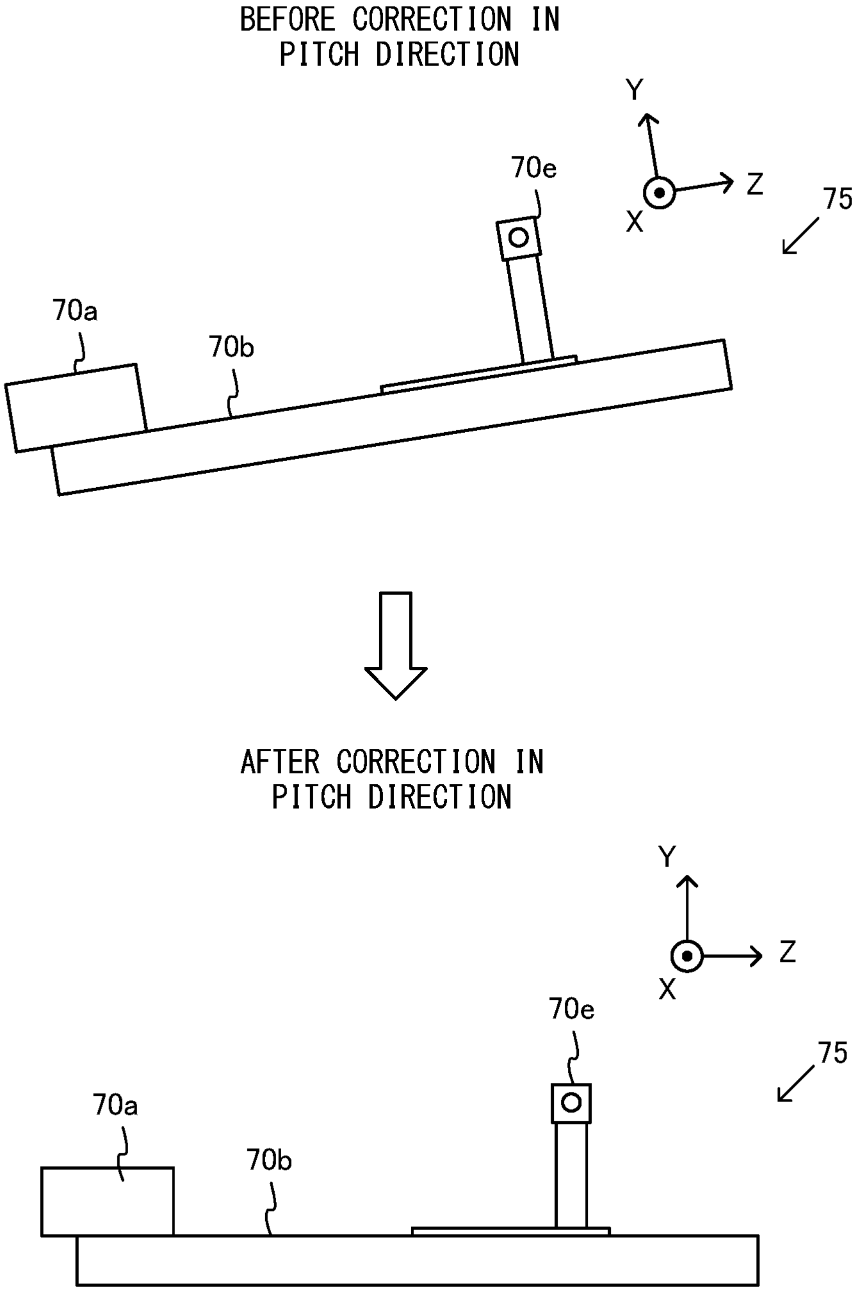
FIG. 26 is an example non-limiting diagram showing an exemplary correction of the posture of the control stick object 70*e* in the pitch direction.

FIG. 25 is a diagram showing an exemplary correction of the posture of the control stick object 70*e* in the roll direction. FIG. 26 is a diagram showing an exemplary correction of the posture of the control stick object 70*e* in the pitch direction.

In FIG. 25, the traveling direction of the airplane object 75 is from the side close to the viewer to the side away from the viewer. As shown in FIG. 25, when the airplane object 75 flies in the virtual space, the airplane object 75 may, for example, rotate in the roll direction under the influence of a wind. At this time, the control stick object 70*e* tilts in the left or right direction. In this case, the posture of the airplane object 75 is corrected so as to bring the posture of the control stick object 70*e* close to horizontal. For example, the entire airplane object 75 is rotated about the Z-axis (or about the axis in the depth direction of the virtual space) so as to bring the X-axis of the control stick object 70*e* closer to parallel to the axis of the lateral direction in the virtual space (to bring an angle of the X-axis with respect to the axis of the lateral direction close to 0 degrees).

Further, FIG. 26 illustrates the airplane object 75 as seen from a lateral direction of the virtual space. As shown in FIG. 26, when the airplane object 75 flies in the virtual space, the airplane object 75 may, for example, rotate in the pitch direction under the influence of wind. At this time, the control stick object 70*e* tilts forward or rearward. In this case, the posture of the airplane object 75 is corrected so as to bring the posture of the control stick object 70*e* close to horizontal. For example, the entire airplane object 75 is rotated about the X-axis (or about the axis in the lateral direction of the virtual space) so as to bring the Z-axis of the control stick object 70*e* closer to parallel to the axis of the depth direction in the virtual space (to bring an angle of the Z-axis with respect to the axis of the depth direction close to 0 degrees).

With the correction as described above, the control stick object 70*e* is brought closer to horizontal even if the airplane object 75 tilts in the virtual space. This allows the user to easily steer the airplane object 75 by using the control stick object 70*e*. Note that the above correction is performed only for the roll direction or the pitch direction in this exemplary embodiment, and the yaw direction is not subject to such correction.

Note that, while the control stick object 70*e* is corrected so as to become closer to horizontal in FIG. 25 and FIG. 26, the amount of correction may be limited to a predetermined range and the control stick object 70*e* does not have to be horizontal even after the correction if the airplane object 75 is tilted by a predetermined amount or more in the roll direction. Further, the amount of correction can be small, and the control stick object 70*e* does not have to be brought back to horizontal by the correction, when the rotational force in the roll direction or the pitch direction is equal to or greater than a predetermined value. For example, the correction is performed by providing the assembled object (or to each of the virtual objects constituting the assembled object) with a rotational force (or rotating speed) in the roll direction or the pitch direction, and the amount of correction (the rotational force or the rotating speed applied) is set relatively small. To the airplane object 75, a rotational force (rotating speed) in the roll direction or the pitch direction is given, for example, under the influence of wind or by another object. When this rotational force is a predetermined force or greater, the rotational force by the correction is canceled, and the airplane object 75 may not be brought back to horizontal by the correction.

The correction of the posture in the roll direction or the pitch direction may be performed only to the airplane object 75 (a wing object having a control stick object), or the similar correction may be performed to a different assembled object having the control stick object 70*e*. For example, in a case of the 4-wheeled vehicle object 76, the 4-wheeled vehicle object 76 may be rotated in the roll direction or the pitch direction so as to bring the control stick object 70*e* closer to horizontal.

(Description of Data Used for Game Processing)

Figure 27:
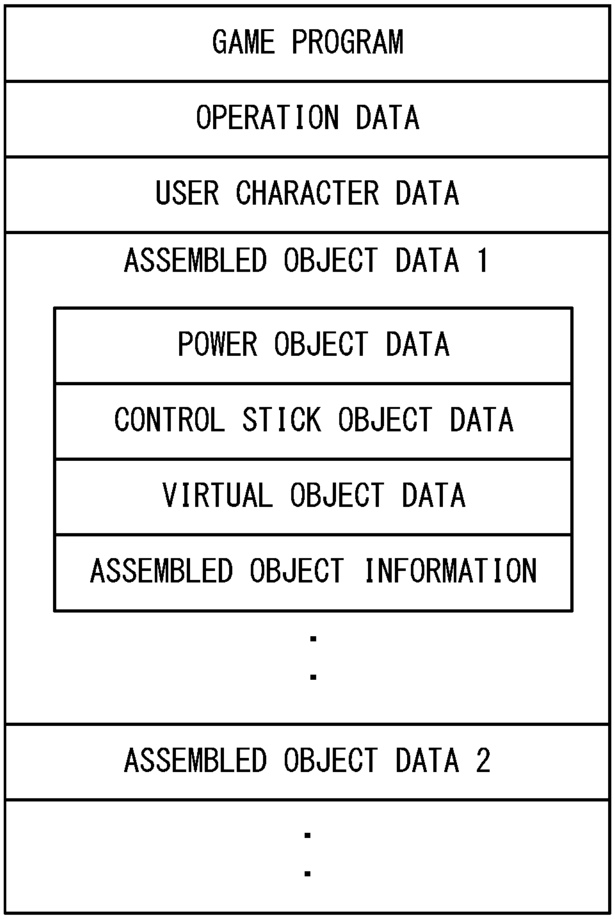
FIG. 27 is an example non-limiting diagram showing exemplary data stored in a memory of the main body apparatus 2 while game processing is executed.

Next, the following describes data used in the above-described game processing. FIG. 27 is a diagram showing exemplary data stored in a memory of the main body apparatus 2 while game processing is executed.

As shown in FIG. 27, the memory (the DRAM 85, the flash memory 84, or an external storage medium) of the main body apparatus 2 stores a game program, operation data, user character data, and a plurality of sets of assembled object data.

The game program is a program for executing the above-described game processing. The game program is stored in advance in the external storage medium or the flash memory 84 mounted in the slot 23, and is read into the DRAM 85 at a time of executing the game. The game program may be obtained from another device via a network (e.g., the Internet).

The operation data includes data from each button 103 of the left controller 3, the analog stick 32, an acceleration sensor 104, an angular velocity sensor 105, each button 113 of the right controller 4, the analog stick 52, an acceleration sensor 114, and an angular velocity sensor 115. The main body apparatus 2 receives the operation data from each controller at predetermined time intervals (for example, at intervals of 1/200 second), and stores the operation data in a memory. The operation data further includes data from the main body apparatus 2 (data from the acceleration sensor, the angular velocity sensor, the touch panel, and the like).

The user character data is data related to the user character PC and includes information related to the position and posture of the user character PC in the virtual space. The user character data may include information indicating an item, an ability, and the like owned by the user character PC.

The assembled object data is data related to a single assembled object including a plurality of virtual objects 70, which is created by the user. When a plurality of assembled objects are arranged in the virtual space, a set of assembled object data is stored for each of the assembled object.

The assembled object data includes data related to a plurality of virtual objects 70 constituting the assembled object. Specifically, the assembled object data includes power object data. The power object data is data related to a power object (e.g., engine object 70*a*, wheel objects 70*c*, and the like) and includes data related to the type of the power object, the position of the power object in the assembled object, posture, operation state, and weight of the power object. The assembled object data includes control stick object data. The control stick object data includes information related to the position of the control stick object 70*e* in the assembled object and the posture of the control stick object 70*e* in the virtual space. The assembled object data further includes virtual object data related to other virtual objects 70. The assembled object data further includes assembled object information.

The assembled object information is information used for calculating the behavior of the assembled object. For example, the assembled object information includes information on the position of the center of gravity of the assembled object. The position of the center of gravity of the assembled object is calculated based on the weight of the plurality of virtual objects 70 constituting the assembled object, the positions of the virtual objects 70 in the assembled object, the postures of the virtual objects 70, and the like.

(Details of Game Processing in Main Body Apparatus 2)

Figure 28:
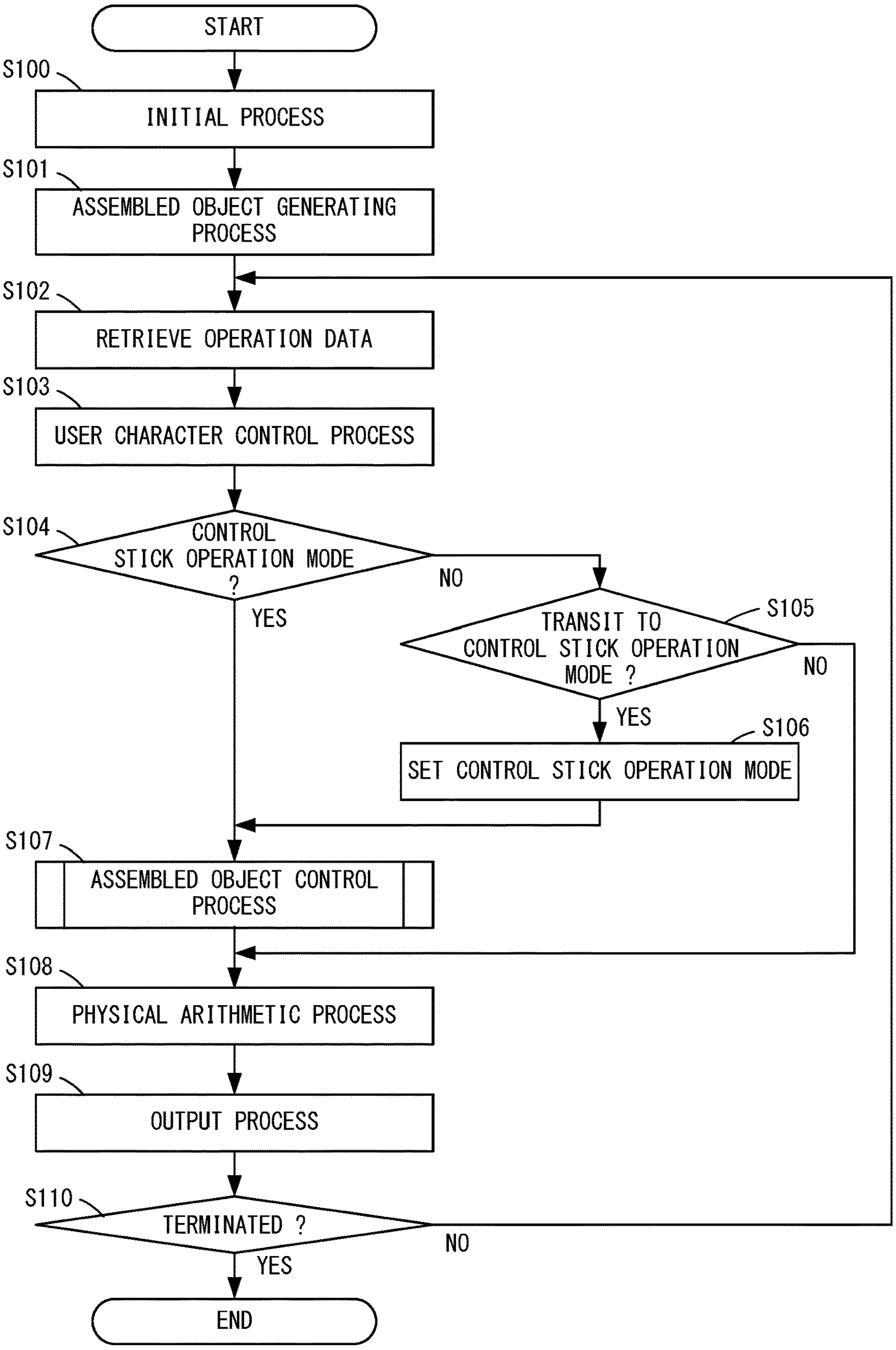
FIG. 28 is an example non-limiting flowchart showing exemplary game processing executed by a processor 81 of the main body apparatus 2.

Next, the following details the game processing performed in the main body apparatus 2. FIG. 28 is a flowchart showing exemplary game processing executed by the processor 81 of the main body apparatus 2.

As shown in FIG. 28, the processor 81 first executes an initial process (step S100). Specifically, the processor 81 sets a virtual space and places a user character PC, a virtual camera, a plurality of virtual objects 70, and the like in the virtual space. In addition to these objects, various objects (e.g., an object representing the ground of the virtual space, objects of trees and buildings fixed in the virtual space) are arranged in the virtual space.

Next, the processor 81 performs an assembled object generating process (step S101). In the assembled object generating process, an assembled object including a plurality of virtual objects 70 is generated in response to an operation by the user, and stored in the memory as assembled object data. Specifically, a virtual object 70 arranged in the virtual space is selected according to a selecting operation by the user, and the selected virtual object 70 is connected with another virtual object 70. By connecting a plurality of virtual objects 70, an assembled object is generated.

After the assembled object generating process, step S102 and steps thereafter are repeated at a predetermined frame time intervals (e.g., at intervals of 1/60 second). Step 102 and the steps thereafter are described below.

In step S102, the processor 81 retrieves operation data. In step S102, the processor 81 retrieves the operation data transmitted from each controller and stored in the memory.

Next, the processor 81 performs a user character control process (step S103). Based on the operation data, the user character PC moves in the virtual space or makes a predetermined action in step S103. For example, when a predetermined operation is performed by using the controller while the user character PC is close to the assembled object, the user character PC gets on the assembled object.

Next, the processor 81 determines whether or not the control stick operation mode for operating the control stick object 70*e* is currently set (step S104). If the control stick operation mode is not set (step S104: NO), the processor 81 determines whether or not to make a transition to the control stick operation mode (step S105). Specifically, when a predetermined operation is performed using the controller while the user character PC is on the assembled object including the control stick object 70*e*, the processor 81 determines YES in step S105.

When the step S105 results in YES, the processor 81 sets the control stick operation mode (step S106). In step 106, the processor 81 moves the player object PC to the position of the control stick object 70*e*. When the step S105 results in NO, on the other hand, the processor 81 executes step S108.

Following step S106, the processor 81 performs the assembled object control process (step S107). The assembled object control process is a process for controlling the movement of the assembled object by using the control stick object 70*e*. Details of the assembled object control process will be described later.

When step S107 is executed, or when step S105 results in NO, the processor 81 performs a physical arithmetic process (step S108). Step S108 performs, for each object in the virtual space, calculation following physical laws, based on the position, size, weight, speed, rotating speed, added force, friction, and the like of the object. When the virtual object 70 or an assembled object in the virtual space moves, a collision with another object is determined, and the behavior of each object is calculated according to the result of this determination.

For example, when a 4-wheeled vehicle object 76 as an assembled object moves, the behavior of the 4-wheeled vehicle object 76 is calculated based on the speed of the 4-wheeled vehicle object 76 in the traveling direction and the rotating speed of the 4-wheeled vehicle object 76 based on the results of step S107. In this case, friction between the wheel objects 70*c* and the ground is taken into account. For example, when a leftward rotation in the yaw direction is added to the 4-wheeled vehicle object 76 by steering the control stick object 70*e*, the processor 81 calculates the behavior of the 4-wheeled vehicle object 76 while reducing the friction with the ground.

Further, when an airplane object 75 as an assembled object flies in the sky, the behavior of the airplane object 75 is calculated based on the speed of the airplane object 75 in the traveling direction and the rotating speed of the airplane object 75 based on the results of step S107.

Next, the processor 81 performs an output process (step S109). Specifically, the processor 81 generates a game image based on the virtual camera, and displays the game image on the display 12 or the stationary monitor. Further, the processor 81 outputs, from the speaker, audio resulting from the game processing.

Subsequently, the processor 81 determines whether to terminate the game processing (step S110). For example, when termination of the game is instructed by the user, the processor 81 determines YES in step S110 and terminates the game processing shown in FIG. 28. If step S110 results in NO, the processor 81 repeats the processing from step S102.

(Assembled Object Control Process)

Figure 29:
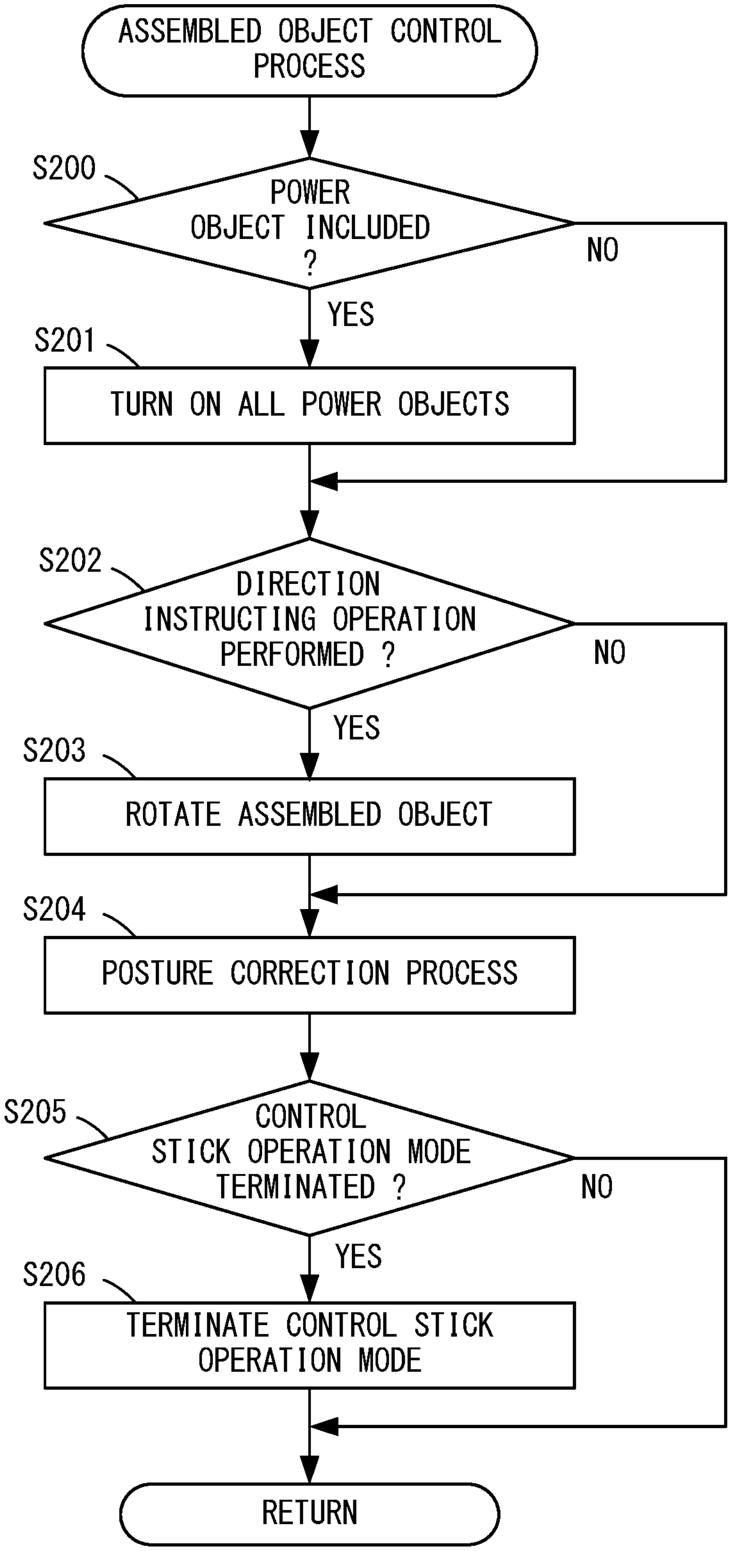
FIG. 29 is an example non-limiting flowchart showing an exemplary assembled object control process of step S107.

Next, the assembled object control process of step S107 is detailed below. FIG. 29 is a flowchart showing an exemplary assembled object control process of step S107.

As shown in FIG. 29, the processor 81 determines whether the assembled object includes a power object (step S200). If the assembled object includes a power object (step S200: YES), the processor 81 sets all power objects in the assembled object to the ON state (step S201).

If step S201 is performed, or if the step S200 results in NO, the processor 81 determines whether a direction instructing operation is performed, based on the operation data (step S202). For example, the processor 81 determines whether the direction instructing operation is performed by using the analog stick 32.

When the direction instructing operation is performed (step S202: YES), the processor 81 rotates the assembled object (step S203). Specifically, the processor 81 adds a rotating speed to each of the virtual objects 70 in the assembled object according to the direction input by the analog stick 32, so that the virtual objects 70 rotate about the center of gravity of the assembled object. By performing the physical arithmetic process in step S108 based on the rotating speed added in step S203, each of the virtual objects 70 is rotated, thus rotating the assembled object.

For example, in step S203, the processor 81 rotates, in response to an input of the left or right direction from the analog stick 32, each of the virtual objects 70 in the assembled object in the yaw direction (around the top-to-bottom axis of the virtual space) with the center of gravity of the assembled object as the reference. As a result, the assembled object makes a turn in the yaw direction (in the left or right direction). Further, the processor 81 rotates, in response to an input of the upward or downward direction from the analog stick 32, each of the virtual objects 70 in the assembled object in the pitch direction (around the axis in the left-to-right axis of the virtual space) with the center of gravity of the assembled object as the reference.

When step S203 is executed, or when step S202 results in NO, the processor 81 performs a posture correction process (step S204). Here, as described hereinabove, the processor 81 rotates the assembled object in the roll direction or the pitch direction so as to bring the posture of the control stick object 70*e* closer to horizontal.

Next, the processor 81 determines whether to terminate the control stick operation mode (step S205). The processor 81 determines YES in step S205 when termination of the control stick operation mode is instructed by using the controller, and terminates the control stick operation mode (step S206). Specifically, in step S206, the processor 81 sets, to the OFF state, all the power objects having been set to the ON state in step S201. This stops the movement of the assembled object, and causes the user character PC to move away from the position of the control stick object 70*e*.

If step S206 is performed or step S205 results in NO, the processor 81 terminates the processing shown in FIG. 29.

Note that the processing of the above-described flowchart is no more than an example, and the sequence, the contents, and the like of the processing may be suitably modified.

As described hereinabove, in this exemplary embodiment, the user generates an assembled object by assembling a plurality of virtual objects 70 arranged in a virtual space (step S101). The plurality of virtual objects 70 include virtual power objects (engine object 70*a*, wheel objects 70*c*, fan object 70*f*, and the like) configured to provide power to the assembled object and a virtual controller object (control stick object 70*e*). The user can generate, as the assembled object, a movable object including the virtual power object and the virtual controller object, which can move in the virtual space. When the virtual controller object is included in the movable object, the virtual power object is operated and the movable object moves in a predetermined traveling direction (step S201), and the moving direction of the movable object is changed based on an input by the user (step S203).

Thus, the user can generate an assembled object by assembling a plurality of virtual objects and control the movement of the assembled object by using a virtual controller object. Therefore, it is possible to diversify the assembled object which is a combination of a plurality of virtual objects. Further, since the operation of the virtual power objects can be controlled by using the virtual controller object, the convenience of the user can be improved.

Further, in this exemplary embodiment, the operation states of the power objects include the ON state that provides power to a movable object and the OFF state that provides no power to the movable object. One virtual power object can be set to the ON state or OFF state based on an input by the user. While the virtual controller object is set as the operation target, all the virtual power objects in the movable object are set to the ON state or OFF state simultaneously. Since a plurality of virtual power objects are simultaneously set to the ON state or OFF state, it is possible to improve the convenience of the user as compared with a case of individually setting the plurality of virtual power objects to the ON state or OFF state. Further, for example, in a case where the virtual power objects are set to the ON state one by one, the moving direction of the movable object changes every time any of the virtual power objects is turned on; however, by simultaneously setting a plurality of virtual power objects to the ON state, it is possible to move the movable object in a predetermined traveling direction. Further, for example, in a case where the virtual power objects are set to the OFF state one by one, the movable object may not be immediately stopped even if the user tries to stop the movable object, because there may be a virtual power objects remaining in the ON state. However, since this exemplary embodiment allows a plurality of virtual power objects to be set to the OFF state simultaneously, the movable object can be stopped at a desirable position or timing.

Further, in this exemplary embodiment, the virtual controller object is arranged at a position in the movable object designated by the user. Further, the movable object has a normal part and a preferential part (preferential connection part BP), and the virtual controller object is preferentially arranged in the preferential part of the movable object. The user can arrange the virtual controller object in a desirable position in the movable object, and the degree of freedom at a time of generating the movable object can be improved. Further, since the virtual controller object is preferentially arranged in the preferential part of the movable object, the convenience for arranging the virtual controller object on the movable object is improved.

Further, in this exemplary embodiment, the user character gets on the movable object including the virtual controller object. This way, the user character is able to control the movable object. For example, the user character operates the virtual controller object on the movable object based on an input by the user to change the direction of at least a part of the virtual controller object (handle part), thereby changing the moving direction of the movable object.

Further, in this exemplary embodiment, the user character is moved by an operation on the analog stick 32 by the user. If the user character is at a position corresponding to the virtual controller object on the movable object (within a predetermined range including the position of the virtual controller object), the user character moves to the position of the virtual controller object in response to an input by the user (e.g., pressing of a predetermined button). When the user character moves to the position of the virtual controller object, the virtual controller object is set as the operation target and the movable object becomes controllable.

Further, in this exemplary embodiment, the moving direction of the movable object changes according to the direction input by the user, irrespective of the position of the virtual controller object in the movable object. Therefore, no matter where the virtual controller object is arranged, the user can change the moving direction of the movable object through the same operation.

Further, even if the virtual power object and the virtual controller object are not in a specific positional relation, the movement of the movable object is controlled in response to an input by the user. Further, the movement of the movable object is controlled in response to an input by the user without having a specific object (e.g., a specific object that transmits power) between the virtual power object and the virtual controller object. That is, the movement of the movable object can be controlled in response to an input by the user, regardless of the positional relation between the virtual power object and the virtual controller object, and without a need of a specific object to connect the virtual power object and the virtual controller object therebetween. Note that, to the contrary, the way the movable object is controlled may be different depending on the positional relation between the virtual power object and the virtual controller object or depending on whether or not a specific object is interposed between them. For example, the movement of the movable object may be controlled in response to an input by the user when the virtual power object and the virtual controller object are in a specific positional relation, and the movement of the movable object may be restricted when the virtual power object and the virtual controller object are not in the specific positional relation. Further, the movement of the movable object may be controlled in response to an input by the user when a specific object is interposed between the virtual power object and the virtual controller object, and the movement of the movable object may be restricted when no specific object is interposed.

Further, in this exemplary embodiment, the user can arrange the virtual controller object in the movable object and designate the direction of the virtual controller object with respect to the movable object. This allows arrangement of the virtual controller object in a desirable direction, and improves the degree of freedom in generating the movable object.

Further, in this exemplary embodiment, the moving direction of the movable object changes according to the direction input by the user, irrespective of the orientation of the virtual controller object in the movable object. Therefore, no matter in which direction the virtual controller object is oriented, the user can change the moving direction of the movable object through the same operation.

Further, in this exemplary embodiment, the moving direction of the movable object is changed by providing the movable object with a rotating speed about the center of gravity of the movable object. Specifically, to each of the virtual objects constituting the movable object, a rotating speed about the center of gravity of the movable object is provided. This way, the moving direction of the movable object can be changed even if the user uses various virtual objects to generate the movable object. Since the movable object is provided with the rotating speed with the center of gravity as the reference, for example, a natural behavior of an assembled object without power can be achieved without an unnatural acceleration in the movement of the assembled object.

Further, this exemplary embodiment allows generating of a movable object (4-wheeled vehicle object) which moves in the virtual space while contacting the ground. To change the moving direction of such a 4-wheeled vehicle object, the friction between the 4-wheeled vehicle object and the ground is reduced as compared to a case of moving the 4-wheeled vehicle object in a predetermined traveling direction. This makes it easier to turn the 4-wheeled vehicle object.

Further, in this exemplary embodiment, the posture of the movable object in the roll direction or the pitch direction is corrected so as to bring the posture, in the virtual space, of the virtual controller object in the movable object to a predetermined posture (e.g., horizontal posture). This allows the virtual controller object to be maintained at a predetermined posture even if the posture of the movable object changes, and improves the operability.

Further, in this exemplary embodiment, the assembled object (movable object) can be operated by using a common control stick object. Since a user can freely assemble an assembled object (movable object), the user may not know what type of the assembled movable object (e.g., car or airplane) it falls into; however, the common control stick object can be assembled to any type of movable objects. This contributes to excellent usability. For example, if the movable object includes a power object, a common control stick object can be used for that power object regardless of the type of the power object. As described, any movable object can be operated by using the common control stick object. This provides a common way to operate the movable object thus improving the usability, and also allows intuitive operation. For example, regarding the moving direction of a movable object, the tendency of changes in the moving direction of the movable object in response to a given user operation may be common, regardless of the type of the virtual objects constituting the movable object or how these virtual objects are assembled. Note that, if the movable object includes a power object, the power object may be set to ON by a common operation to the control stick object, regardless of the type of the power object. Further, it is possible to switch the operation target between a first movable object and a second movable object by using a single control stick object by detaching only the control stick object from the first movable object and bonding the control stick object with the second movable object.

Note that the number of types of control stick objects common to the above described plurality of movable objects may be only one. Further, there may be provided only one control stick object of the one type. Further, although the number of types of the control stick objects is one, the number of control stick objects provided may be more than one.

Further, the above-described exemplary embodiment deals with a case where the control stick object is used to control the ON/OFF of one or more power objects included in the movable object, but the control stick object may not be used to control the ON/OFF of the power objects. For example, the power objects included in the movable object may always be in the ON state, irrespective of the operation using the control stick object. Further, a plurality of power objects included in the movable object may be normally in the OFF state, and the plurality of power objects may be controlled so as to be in the ON state individually or collectively by an operation different from the operation using the control stick object. As described, even if the ON/OFF of the power objects is not controlled by the control stick object, the control stick object may control the moving direction and moving speed of the movable object.

(Modification)

An exemplary embodiment is thus described hereinabove. It should be noted that the above-described exemplary embodiment is no more than an example, and various modifications as described below are possible.

For example, the operation by the user for controlling the movement of the assembled object in the above-described exemplary embodiment is no more than an example, and the movement of the assembled object (movable object) may be controlled by using any button on the controllers 3 and 4, and/or the analog stick. For example, the movable object may start to move in a predetermined traveling direction when a predetermined button on the controller 3 or 4 is pressed, and the moving direction of the movable object may be changed when another button is pressed. Alternatively, the movable object may start moving in a predetermined traveling direction in response to an operation to the analog stick, and may change its moving direction in response to an operation to the same or a different analog stick. Further, the movement of the movable object may be controlled based on the posture of the controller 3 or 4, or the posture of the main body apparatus 2.

Further, the above-described exemplary embodiment deals with a case where the assembled object is set to be controllable (set as an operation target) in response to a predetermined operation, when the user character is on the assembled object and the user character moves to the position of the control stick object on the assembled object. Any method is adoptable for setting the assembled object as the operation target. For example, the assembled object may be set as the operation target in response to a predetermined operation while the user character is positioned at a position corresponding to the control stick object, rather than setting the user character being on the assembled object as the condition. The assembled object may be set as the operation target in response to a predetermined operation while the user character is positioned near the assembled object. Further, the assembled object may be set as the operation target as long as a position-related condition is met, without requiring the predetermined operation. Alternatively, the assembled object may be set as the operation target in response to a suitable operation, regardless of the positions of the user character and the assembled object.

Further, in the above-described exemplary embodiment, the traveling direction of the movable object is determined based on the position and the posture of the power object in the movable object, and the movable object is moved in the traveling direction while the control stick object 70*e* is not steered. When the control stick object 70*e* is steered, the moving direction of the movable object is changed by rotating the movable object about the axis at the center of gravity. In another exemplary embodiment, the moving direction of the movable object may be changed by another method. For example, when the control stick object 70*e* is steered to the left or right direction, the moving direction of the movable object may be changed to the left or right by changing the direction of the power object in the movable object in the left or right direction. Further, in another exemplary embodiment, when the control stick object 70*e* is steered to the left or right direction, the moving direction of the movable object may be changed to the left or right by providing the movable object with a speed of translation in the left or right direction. Further, in yet another exemplary embodiment, when the control stick object 70*e* is steered to the left or right direction, the moving direction of the movable object may be changed to the left or right by providing the movable object with an acceleration (force) in the left or right direction.

Further, in the above-described exemplary embodiment, the operation state of the power object is either the ON state or the OFF state. In another exemplary embodiment, the output value (power) of the power object may be variable. For example, when the control stick object 70*e* is set as the operation target, the movable object may be moved in the traveling direction by raising the output value of the power object in the movable object. Further, for example, when the control stick object 70*e* is steered to the left or right direction, the moving direction of the movable object may be changed to the left or right by changing the output value of the power object in the movable object. Further, the output value of the power object may be changed by using the control stick object 70*e* so as to start or stop the movement of the movable object, or to change the moving speed of the movable object.

Further, in the above-described exemplary embodiment, the power object provides a predetermined speed as a power to the assembled object. Then, based on the speed given to each object, the behavior of each object is calculated. In another exemplary embodiment, the power object may provide a force (acceleration) to the assembled object, and the behavior of each object may be calculated based on the given force (acceleration).

Further, each of the virtual objects 70 in the above-described exemplary embodiment is no more than an example, and other virtual objects may be used. For example, as an exemplary virtual controller object, the above-described exemplary embodiment adopts the control stick object 70*e*. However, in another exemplary embodiment, an object simulating a steering wheel may be adopted as the virtual controller object. Further, the virtual controller object may be an object simulating a cockpit or a control cabin.

Further, in the above-described exemplary embodiment, the user character PC is arranged at the position of the control stick object 70*e* when the control stick object 70*e* is set as the operation target. In another exemplary embodiment, the position of the user character PC does not necessarily have to match with the position of the control stick object 70*e*, and the user character PC may be arranged within a predetermined range determined according to the position of the control stick object 70*e*. Further, the method for setting the control stick object 70*e* as the operation target is not limited to pressing of a button, and may be any other given method. For example, the control stick object 70*e* may be set as the operation target by the user indicating the control stick object 70*e* with a predetermined indication marking.

Further, the user may generate a movable object that includes the control stick object 70*e* but not including a power object. The moving direction of such a movable object without a power object is changed by using the control stick object. Specifically, in a case where such a movable object is generated by the user, the movable object is given a speed in a predetermined direction. For example, the speed may be given when the user character makes a predetermined action to the movable object. Alternatively, the speed may be given by causing the movable object to fall or slide on a slope. Further, a speed may be given to the movable object by having another object colliding with the movable object. Such a speed given can be deemed as power in the moving direction. As described, on a premise that the movable object is moving in a predetermined direction, the moving direction of the movable object may be changed in response to an input by the user while the control stick object in the movable object is set as the operation target based on an input by the user.

Further, in a situation where the movable object including the control stick object 70*e* but not including the power object is moving on a sloped surface and the like, the power of the movable object in its traveling direction may occur when the user character PC moves to the position of the control stick object 70*e*. The direction (traveling direction) of such power is set, using the movable object as the reference. In this case, steering of the control stick object 70*e* rotates the movable object about the center of gravity, and also rotates the traveling direction, according to the direction of the steering. This way, the movable object makes a turn.

Further, the above-described exemplary embodiment deals with a case where the assembled object is generated by assembling a plurality of virtual objects 70 placed in the virtual space. In another exemplary embodiment, at least some of the plurality of virtual objects 70 may not be placed in the virtual space and may be accommodated in an accommodation area during the stage of generating the assembled object. For example, the power object may be placed in the virtual space and the control stick object may be accommodated in the accommodation area. Further, the control stick object may be placed in the virtual space and the power object may be accommodated in the accommodation area. By assembling these virtual objects arranged in the virtual space or accommodated in the accommodation area, an assembled object including a power object and a control stick object is generated, and the assembled object thus generated may be arranged in the virtual space.

In another exemplary embodiment, the number of types of control stick objects may be more than one. For example, there may be a first control stick object and a second control stick object which are of different types, and the user may be allowed to assemble, to a movable object, the first control stick object or the second control stick object. In this case, a movable object including the second control stick object may move and change the direction faster than a movable object including the first control stick object. Further, a plurality of types of control stick objects may be provided, and there may be corresponding type of control stick object capable of controlling the moving direction of the movable object for each type of power or each configuration(type) of the assembled object (movable object).

Further, the above-described exemplary embodiment deals with a case where a power object that supplies power is assembled to the assembled object; however, a non-power object that does not supply power (e.g., a light object that emits light) may be assembled to the assembled object. The ON/OFF of the non-power object may be controlled by using the control stick object. If the assembled object includes a plurality of non-power objects, the ON/OFF of the plurality of non-power objects may be controllable collectively or individually by using a control stick object. Further, if the assembled object includes a plurality of non-power objects and a plurality of power objects, the ON/OFF of the plurality of non-power objects and the ON/OFF of the plurality of power objects may be controllable collectively or individually by using a control stick object. That is, the ON/OFF of such ON/OFF switchable objects included in the assembled object may be controlled collectively or individually by using the control stick object, regardless of whether the objects supply power or not.

Note that the control stick object may be capable of controlling only the power object out of the power object and non-power object included in an assembled object. If the assembled object includes a plurality of power objects and a plurality of non-power objects, the control stick object may be capable of controlling the plurality of power objects so as to switch all the power objects to the ON state or the OFF state simultaneously. To the contrary, the control stick object may be capable of controlling only the non-power object out of the power object and non-power object included in an assembled object. Further, a control stick object capable of controlling only the power object and a control stick object capable of controlling only the non-power object may be provided.

The configuration of hardware for performing the above game is merely an example. Alternatively, the above game processing may be performed by any other piece of hardware. For example, the above game processing may be executed in any information processing system such as a personal computer, a tablet terminal, a smartphone, or a server on the Internet. The above game processing may be executed in a dispersed manner by a plurality of apparatuses.

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer readable storage medium configured to store computer readable instructions that, when executed by a processor, cause the processor to provide execution comprising:

generating an assembled object by assembling a plurality of virtual objects based on an input by a user, wherein the plurality of virtual objects includes one or more virtual power objects configured to provide power to the assembled object when the virtual power object is assembled as a part of the assembled object and a virtual controller object capable of being assembled as a part of the assembled object;

controlling the assembled object arranged in the virtual space; and while the one or more virtual power objects and the virtual controller object are included in the assembled object, causing the one or more virtual power objects to operate to move the assembled object in a predetermined traveling direction, and causing a moving direction of the assembled object to change based on the input by the user, wherein the virtual controller object is arranged at a position in the assembled object designated by the user.

2. The non-transitory computer readable storage medium of claim 1, wherein an operation state of each of the one or more virtual power objects includes an ON state that provides the power and an OFF state that does not provide the power; and the processor is further caused to provide execution comprising:

setting the operation state of one of the virtual power objects to the ON state or the OFF state based on an input by the user, generating the assembled object including the virtual controller object and a plurality of the virtual power objects, and simultaneously setting all the virtual power objects in the assembled object to the ON state or the OFF state.

3. The non-transitory computer readable storage medium of claim 1, wherein the virtual objects constituting the assembled object are each provided with a preferential part which is given priority over other parts, and the virtual controller object is preferentially arranged in the preferential part of a virtual object constituting the assembled object.

4. The non-transitory computer readable storage medium of claim 1, wherein the processor is further caused to provide execution comprising changing the moving direction of the assembled object according to an input direction by the user, irrespective of the position of the virtual controller object in the assembled object.

5. The non-transitory computer readable storage medium of claim 1, wherein the processor is further caused to provide execution comprising changing the moving direction of the assembled object by giving the assembled object a rotating speed about a position of a center of gravity of the assembled object.

6. The non-transitory computer readable storage medium of claim 5, wherein the processor is further caused to provide execution comprising changing the moving direction of the assembled object by giving each of the virtual objects constituting the assembled object the rotating speed about the position of the center of gravity of the assembled object.

7. The non-transitory computer readable storage medium of claim 1, wherein the assembled object is an object that moves in the virtual space while contacting the ground, and the processor is further caused to provide execution comprising reducing friction between the assembled object and the ground as compared to friction while the assembled object moves in the traveling direction when the moving direction of the assembled object is changed.

8. The non-transitory computer readable storage medium of claim 1, wherein the processor is further caused to provide execution comprising correcting the posture of the assembled object in a roll direction or a pitch direction so as to bring the posture, in the virtual space, of the virtual controller object in the assembled object to a predetermined posture.

9. The non-transitory computer readable storage medium of claim 1, wherein the processor is further caused to provide execution comprising:

generating a first assembled object including a plurality of the virtual objects and a second assembled object including a plurality of the virtual objects, and assembling the virtual controller object to either the first assembled object or the second assembled object.

10. A non-transitory computer readable storage medium configured to store computer readable instructions that, when executed by a processor, cause the processor to provide execution comprising:

generating an assembled object by assembling a plurality of virtual objects based on an input by a user, wherein the plurality of virtual objects includes one or more virtual power objects configured to provide power to the assembled object when the virtual power object is assembled as a part of the assembled object and a virtual controller object capable of being assembled as a part of the assembled object;

controlling the assembled object arranged in the virtual space; and while the one or more virtual power objects and the virtual controller object are included in the assembled object, causing the one or more virtual power objects to operate to move the assembled object in a predetermined traveling direction, and causing a moving direction of the assembled object to change based on the input by the user, wherein the processor is further caused to provide execution comprising:

moving a user character in the virtual space;

moving the user character to a position corresponding to the virtual controller object based on an input by the user; and when the user character is at the position corresponding to the virtual controller object, controlling the assembled object in response to an input by the user.

11. The non-transitory computer readable storage medium of claim 10, wherein the processor is further caused to provide execution comprising causing the user character to operate the virtual controller object, thereby changing a direction of at least a part of the virtual controller object and changing a moving direction of the assembled object.

12. A non-transitory computer readable storage medium configured to store computer readable instructions that, when executed by a processor, cause the processor to provide execution comprising:

generating an assembled object by assembling a plurality of virtual objects based on an input by a user, wherein the plurality of virtual objects includes one or more virtual power objects configured to provide power to the assembled object when the virtual power object is assembled as a part of the assembled object and a virtual controller object capable of being assembled as a part of the assembled object;

controlling the assembled object arranged in the virtual space; and while the one or more virtual power objects and the virtual controller object are included in the assembled object, causing the one or more virtual power objects to operate to move the assembled object in a predetermined traveling direction, and causing a moving direction of the assembled object to change based on the input by the user, wherein the virtual controller object is arranged in the assembled object so as to be oriented as designated by the user.

13. The non-transitory computer readable storage medium of claim 12, wherein the processor is further caused to provide execution comprising changing the moving direction of the assembled object according to an input direction by the user, irrespective of the orientation of the virtual controller object in the assembled object.

14. An information processing method executable via an information processing system, the method comprising:

generating an assembled object by assembling a plurality of virtual objects based on an input by a user, wherein the plurality of virtual objects includes one or more virtual power objects configured to provide power to the assembled object when the virtual power object is assembled as a part of the assembled object and a virtual controller object capable of being assembled as a part of the assembled object;

controlling the assembled object arranged in the virtual space; and while the one or more virtual power objects and the virtual controller object are included in the assembled object, causing the one or more virtual power objects to operate to move the assembled object in a predetermined traveling direction, and causing a moving direction of the assembled object to change based on the input by the user, wherein the virtual controller object is arranged at a position in the assembled object designated by the user.

15. The method of claim 14, wherein the virtual objects constituting the assembled object are each provided with a preferential part which is given priority over other parts, and the virtual controller object is preferentially arranged in the preferential part of a virtual object constituting the assembled object.

16. The method of claim 14, further comprising changing the moving direction of the assembled object according to an input direction by the user, irrespective of the position of the virtual controller object in the assembled object.

17. An information processing method executable via an information processing system, the method comprising:

generating an assembled object by assembling a plurality of virtual objects based on an input by a user, wherein the plurality of virtual objects includes one or more virtual power objects configured to provide power to the assembled object when the virtual power object is assembled as a part of the assembled object and a virtual controller object capable of being assembled as a part of the assembled object;

controlling the assembled object arranged in the virtual space; and while the one or more virtual power objects and the virtual controller object are included in the assembled object, causing the one or more virtual power objects to operate to move the assembled object in a predetermined traveling direction, and causing a moving direction of the assembled object to change based on the input by the user, wherein the method further comprises:

moving a user character in the virtual space;

moving the user character to a position corresponding to the virtual controller object based on an input by the user; and when the user character is at the position corresponding to the virtual controller object, controlling the assembled object in response to an input by the user.

18. The method of claim 17, further comprising causing the user character to operate the virtual controller object, thereby changing a direction of at least a part of the virtual controller object and changing a moving direction of the assembled object.

19. An information processing method executable via an information processing system, the method comprising:

generating an assembled object by assembling a plurality of virtual objects based on an input by a user, wherein the plurality of virtual objects includes one or more virtual power objects configured to provide power to the assembled object when the virtual power object is assembled as a part of the assembled object and a virtual controller object capable of being assembled as a part of the assembled object;

controlling the assembled object arranged in the virtual space; and while the one or more virtual power objects and the virtual controller object are included in the assembled object, causing the one or more virtual power objects to operate to move the assembled object in a predetermined traveling direction, and causing a moving direction of the assembled object to change based on the input by the user, wherein the virtual controller object is arranged in the assembled object so as to be oriented as designated by the user.

20. The method of claim 19, further comprising changing the moving direction of the assembled object according to an input direction by the user, irrespective of the orientation of the virtual controller object in the assembled object.

* * * * *